US011960573B1

United States Patent
Du et al.

(10) Patent No.: US 11,960,573 B1
(45) Date of Patent: *Apr. 16, 2024

(54) NEURAL NETWORK CATEGORIZATION ACCURACY WITH CATEGORICAL GRAPH NEURAL NETWORKS

(71) Applicant: Microsoft Technology Licensing, LLC, Redmond, WA (US)

(72) Inventors: Tianchuan Du, Sunnyvale, CA (US); Keng-Hao Chang, San Jose, CA (US); Ruofei Zhang, Mountain View, CA (US); Paul Liu, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/981,822

(22) Filed: Nov. 7, 2022

Related U.S. Application Data

(63) Continuation of application No. 16/861,162, filed on Apr. 28, 2020, now Pat. No. 11,551,039.

(51) Int. Cl.
*G06K 9/62* (2022.01)
*G06F 17/16* (2006.01)
(Continued)

(52) U.S. Cl.
CPC ............ *G06F 18/241* (2023.01); *G06F 17/16* (2013.01); *G06F 18/251* (2023.01); *G06F 18/29* (2023.01);
(Continued)

(58) Field of Classification Search
CPC .. G06K 9/6268; G06K 9/6289; G06K 9/6296; G06N 20/20; G06N 20/10;
(Continued)

(56) References Cited

U.S. PATENT DOCUMENTS 11,404,145 B2 *  8/2022  Saripalli .............. A61B 5/7267
2019/0354689 A1 * 11/2019  Li ......................... G06F 21/563
(Continued)

FOREIGN PATENT DOCUMENTS

CA       3061717 A1 *  5/2020  ......... G06F 16/9024

OTHER PUBLICATIONS

Krivosheev E, Atzeni M, Mirylenka K, Scotton P, Casati F. Siamese graph neural networks for data integration. arXiv preprint arXiv: 2001.06543. Jan. 17, 2020. (Year: 2020).*

*Primary Examiner* — Fayyaz Alam
(74) *Attorney, Agent, or Firm* — Rainier Patents, P.S.

(57) ABSTRACT

Neural network-based categorization can be improved by incorporating graph neural networks that operate on a graph representing the taxonomy of the categories into which a given input is to be categorized by the neural network based-categorization. The output of a graph neural network, operating on a graph representing the taxonomy of categories, can be combined with the output of a neural network operating upon the input to be categorized, such as through an interaction of multidimensional output data, such as a dot product of output vectors. In such a manner, information conveying the explicit relationships between categories, as defined by the taxonomy, can be incorporated into the categorization. To recapture information, incorporate new information, or reemphasize information a second neural network can also operate upon the input to be categorized, with the output of such a second neural network being merged with the output of the interaction.

20 Claims, 17 Drawing Sheets

(51) Int. Cl.
*G06F 18/20* (2023.01)
*G06F 18/241* (2023.01)
*G06F 18/25* (2023.01)
*G06F 40/30* (2020.01)
*G06N 3/045* (2023.01)
*G06N 3/084* (2023.01)
*G06N 5/046* (2023.01)
*G06N 20/10* (2019.01)
*G06N 20/20* (2019.01)

(52) U.S. Cl.
CPC ............. *G06F 40/30* (2020.01); *G06N 3/045* (2023.01); *G06N 3/084* (2013.01); *G06N 5/046* (2013.01); *G06N 20/10* (2019.01); *G06N 20/20* (2019.01)

(58) Field of Classification Search
CPC ...... G06N 3/0454; G06N 3/084; G06N 5/046; G06F 40/30; G06F 17/16
See application file for complete search history.

(56) References Cited

U.S. PATENT DOCUMENTS

| | | | |
|---|---|---|---|
| 2021/0201930 A1* | 7/2021 | Ghaffarzadegan | G10L 25/30 |
| 2021/0256355 A1* | 8/2021 | Chen | G06N 3/08 |
| 2022/0215260 A1* | 7/2022 | Dasoulas | G06N 3/048 |

\* cited by examiner

NEURAL NETWORK CATEGORIZATION ACCURACY WITH CATEGORICAL GRAPH NEURAL NETWORKS

BACKGROUND

The ubiquity of massive parallel processing capabilities has facilitated the widespread adoption and utilization of artificial neural networks, which are computing systems that utilize derived parameters to perform functions that were not directly programmed. Instead of directly programming function, training data is utilized to derive appropriate parameters, which can then facilitate the performance of a required function. For example, a neural network can derive parameters, typically referred to as "weights", which can enable computing devices to distinguish between images that comprise, for example, a stop sign, and images that do not. The derivation of the weight values is commonly referred to as "training" the neural network. In the above example, training such a neural network to recognize stop signs in images can comprise providing access to images that are identified as comprising stop signs, as well as images that are identified as not comprising stop signs. Iterative training is then performed to derive appropriate weight values which can then be utilized to recognize whether or not a subsequent input image does, or does not, comprise a stop sign.

Neural networks can also be trained to perform categorization, also referred to herein as "classification", so as to categorize, or "classify", input data into one or more categories, or "classes". The training of such neural networks would be performed in a manner analogous to that described above, namely pre-categorized inputs would be provided, as well as their already determined categories, and the neural network would derive appropriate weight values which can then be utilized to categorize subsequent input. In performing such training, however, each category is usually treated as being independent of, and unrelated to, any other category; much the same manner that the above-described training of a neural network to recognize street signs is performed in such a way that the recognition of, for example, a stop sign is independent of the recognition of, for example, a crosswalk sign. As such, neural-network-based categorization is sub-optimal because, unlike the utilization of neural networks to, for example, recognize street signs that are all independent of one another, categories typically have an explicit relationship to at least some other categories.

SUMMARY

Neural network-based categorization can be improved by incorporating graph neural networks that operate on a graph representing a taxonomy of categories, where the term "taxonomy", as utilized herein, means a collection of categories, and the explicit relationships between them, into which a given input is to be categorized. The output of a graph neural network, operating on a graph representing such a taxonomy of categories, can be combined with the output of a neural network operating upon the input to be categorized, such as through an interaction of multidimensional output data, such as a dot product of output vectors. In such a manner, information conveying the explicit relationships between categories, as defined by the graph, can be incorporated into the categorization. The weight values applied by the neural network layers of the neural network can be tuned coincidentally with the tuning of the weight values applied by the graph neural network layers of the graph neural network. To recapture information, incorporate new information, or reemphasize information a second neural network can also operate upon the input to be categorized, with the output of such a second neural network being merged with the output that represents the interaction between the graph neural network and the first neural network. The weight values applied by such a second neural network can also be tuned coincidentally with the tuning of the other weight values of the other neural networks. Additionally, the outputs of the various paths through the neural networks can be amalgamated, with weighting applied by the amalgamation also being tunable.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

Figure 1:
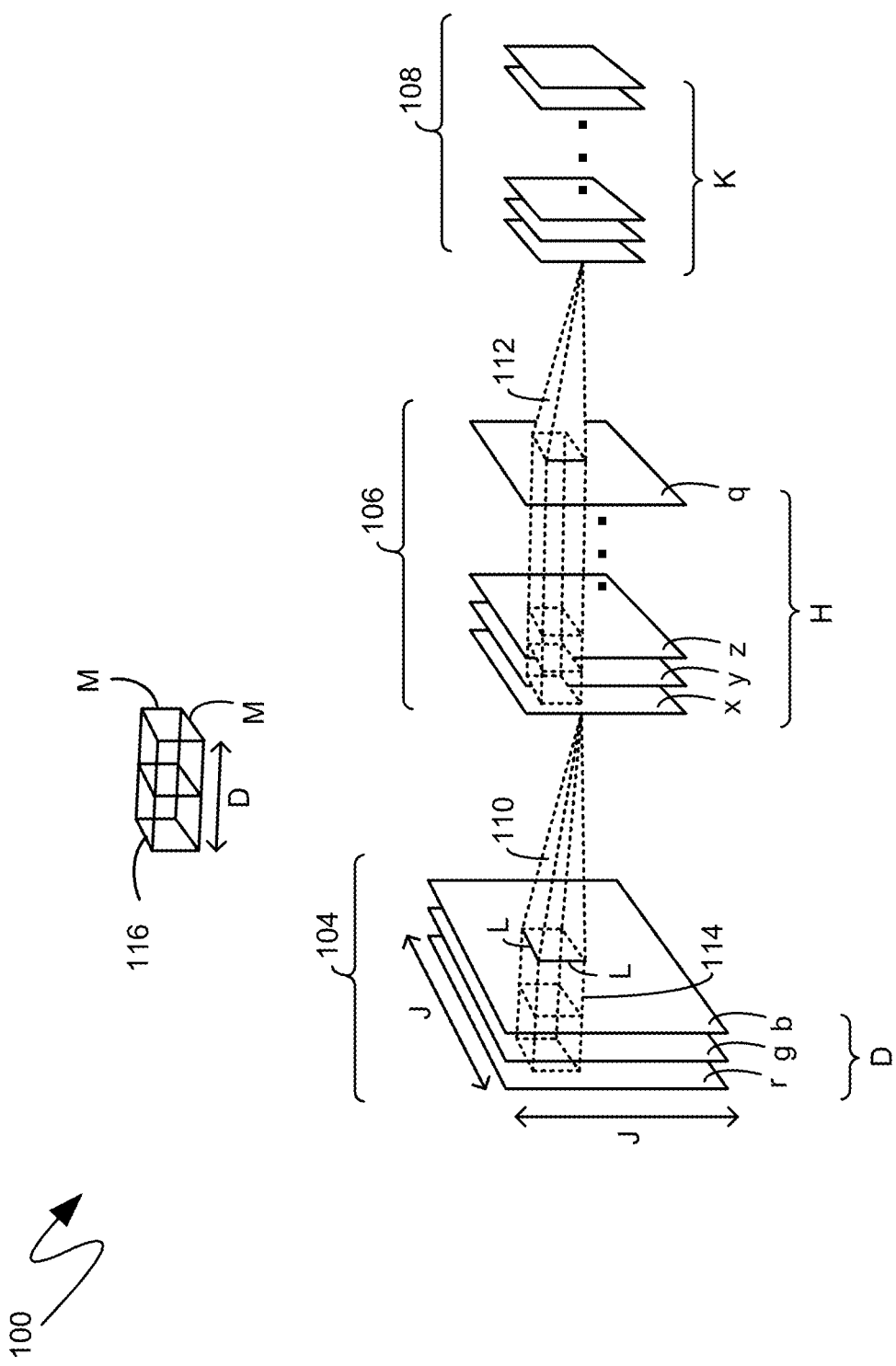
FIG. 1 is a system diagram of an exemplary convolution performed by a neural network.

The following description relates to optimizing neural network-based categorization by incorporating graph neural networks that operate on a graph representing a taxonomy of the categories, where the term "taxonomy", as utilized herein, means a collection of categories, and the explicit relationships between them, into which a given input is to be categorized. The output of a graph neural network, operating on a graph representing such a taxonomy of categories, can be combined with the output of a neural network operating upon the input to be categorized, such as through an interaction of multidimensional output data, such as a dot product of output vectors. In such a manner, information conveying the explicit relationships between categories, as defined by the graph, can be incorporated into the categorization. The weight values applied by the neural network layers of the neural network can be tuned coincidentally with the tuning of the weight values applied by the graph neural network layers of the graph neural network. To recapture information, incorporate new information, or reemphasize information a second neural network can also operate upon the input to be categorized, with the output of such a second neural network being merged with the output that represents the interaction between the graph neural network and the first neural network. The weight values applied by such a second neural network can also be tuned coincidentally with the tuning of the other weight values of the other neural networks. Additionally, the outputs of the various paths through the neural networks can be amalgamated, with weighting applied by the amalgamation also being tunable.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including servers, hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Prior to detailing mechanisms by which a categorical graph neural network can be utilized in conjunction with a neural network to improve categorization accuracy, a general overview of both neural networks and graph neural networks is provided to act as context for the descriptions below. Neural networks, including deep neural networks (DNNs) and convolution neural networks (CNNs), can achieve high accuracy on human recognition tasks such as image and speech recognition. Neural networks may include a number of different processing "layers", including dense, or fully-connected, layers, convolutional layers, pooling layers, normalization layers, and the like. Outputs of convolutional layers may be processed with pooling layers, which subsample the convolved output, and can be further processed with activation functions, which are typically nonlinear functions, such as sigmoid or tanh. FIG. 1 is a simplified diagram depicting a three-dimensional (3D) CNN 100 that includes three exemplary 3D volumes, namely the exemplary volumes 104, 106, 108. Each 3D volume 104, 106, 108 can represent an input to a layer, and can be transformed into a new 3D volume that feeds a subsequent layer. In the example of FIG. 1, there are two convolutional layers, namely the exemplary convolution layers 110 and 112. Volume 104, with 3 planes, can be an input to convolutional layer 110, which can generate volume 106, with H planes, which, in turn, can be an input to convolutional layer 112, which can generate volume 108, with K planes.

For example, volume 104 can include image data in three planes, such as the well-known "red", "green" and "blue" layers of a color image. Each plane can include a two-dimensional array of data. For example, if the exemplary volume 104 was a portion of an image, then the portion could be, for example, one-hundred pixels wide by one-hundred pixels high. In such an instant, the variable "J", shown in FIG. 1, can be a value of one hundred. More or fewer than three planes may be used, and each plane need not include a square array. Additionally, data other than image data may be used.

A 3D input volume, such as the exemplary input volume 114, can be convolved with weight kernels. For example, as shown in FIG. 1, the exemplary input volume 114 can be of dimensions L×L×D, where D is three in the present example. Such an exemplary input volume can be convolved with kernel weights, such as the exemplary kernel weights 116, which can also have a dimension of L×L×D, with, again, the dimension D being three in the present example. Each kernel weight can shifted in a sliding-window-like fashion across the input volume, such as the exemplary volume 104. A stride value can define an amount of such a shift offset. During each shift, each weight in to the 3D kernel weight is multiplied and added with corresponding pair-wise input elements from the overlapping region of input volume 114.

Figure 2A:
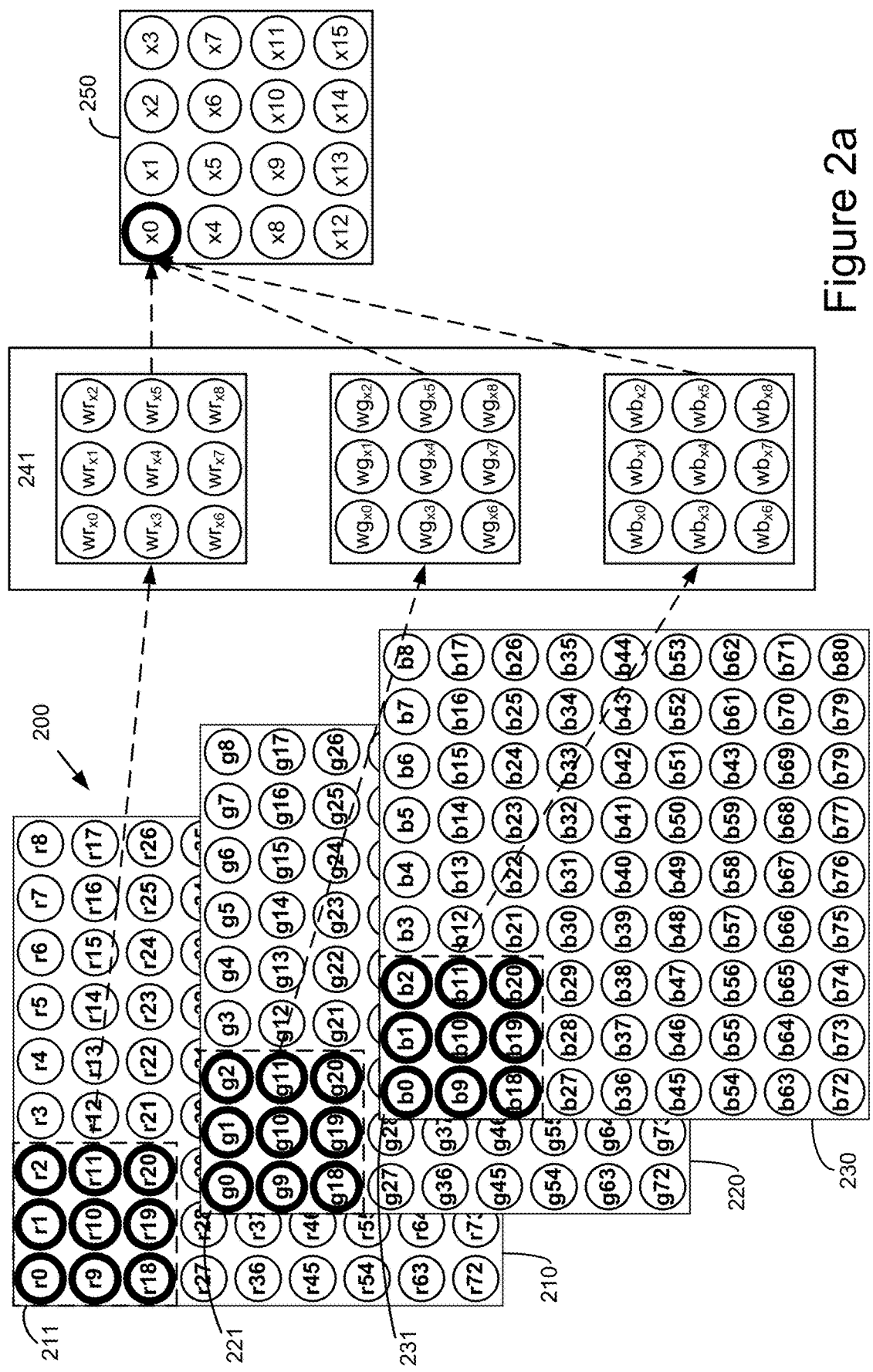
FIGS. 2a-2d are block diagrams of portions of an exemplary convolution performed by a neural network.
Figure 2B:
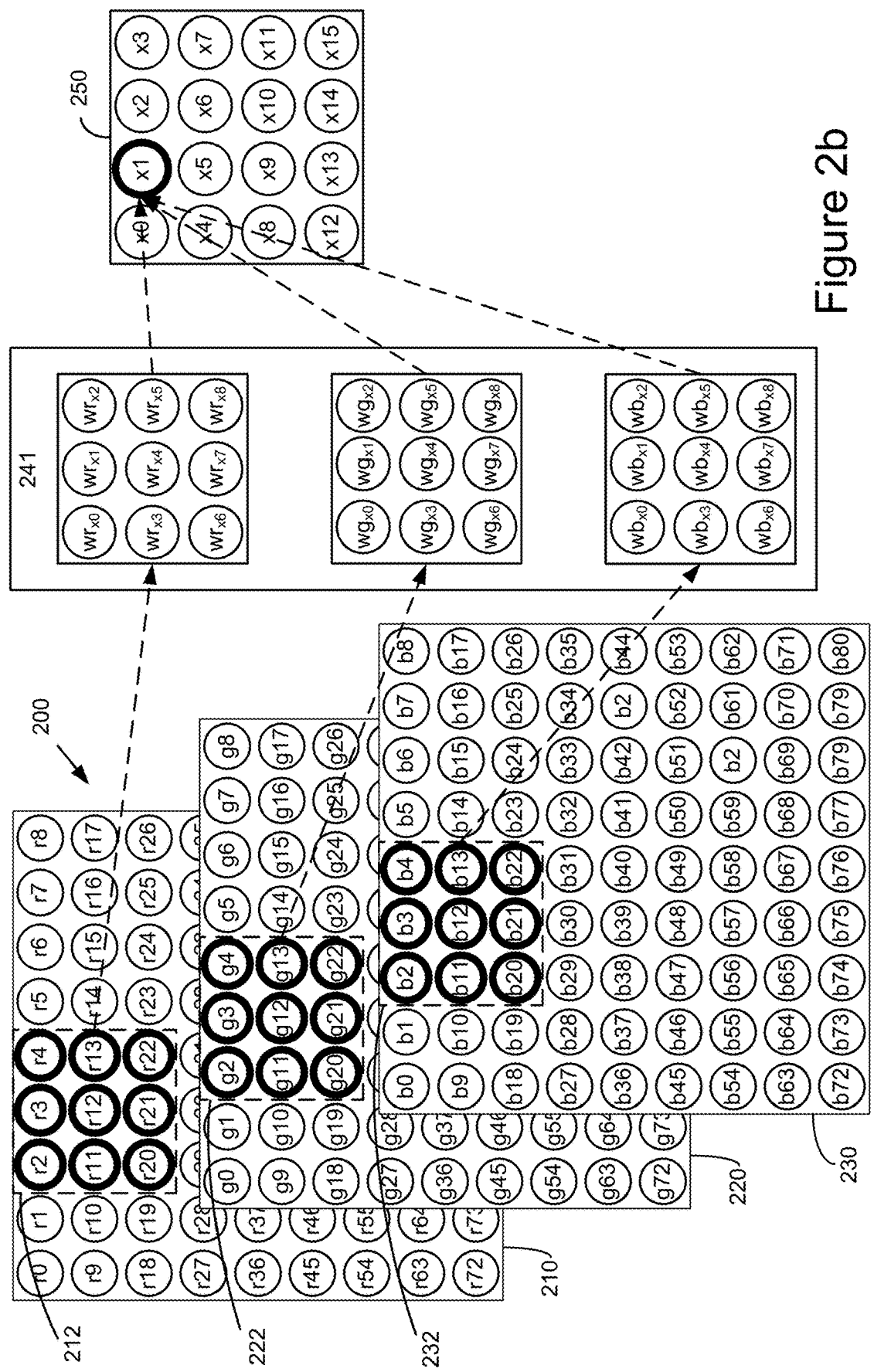
Figure 2C:
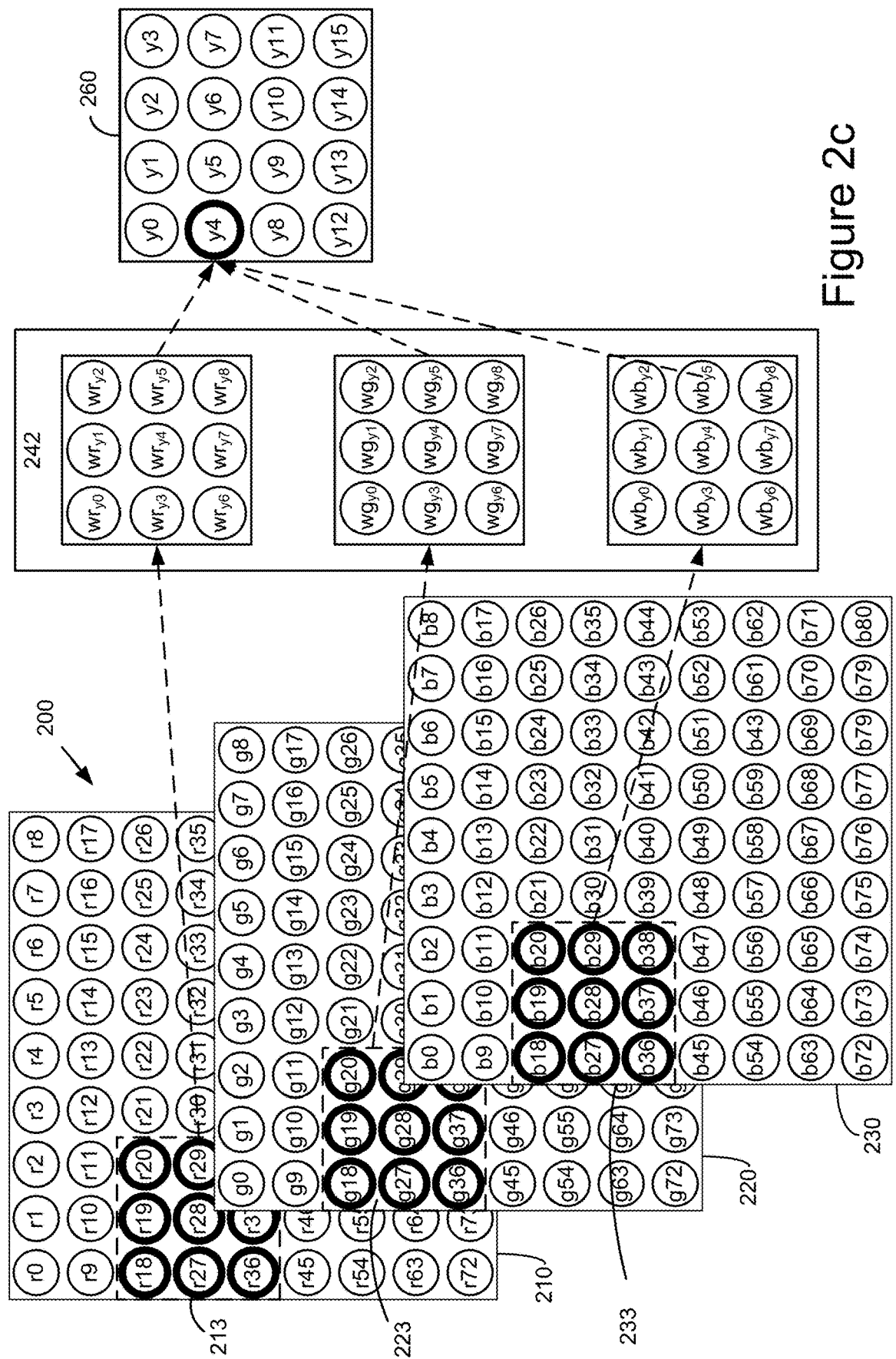
Figure 2D:
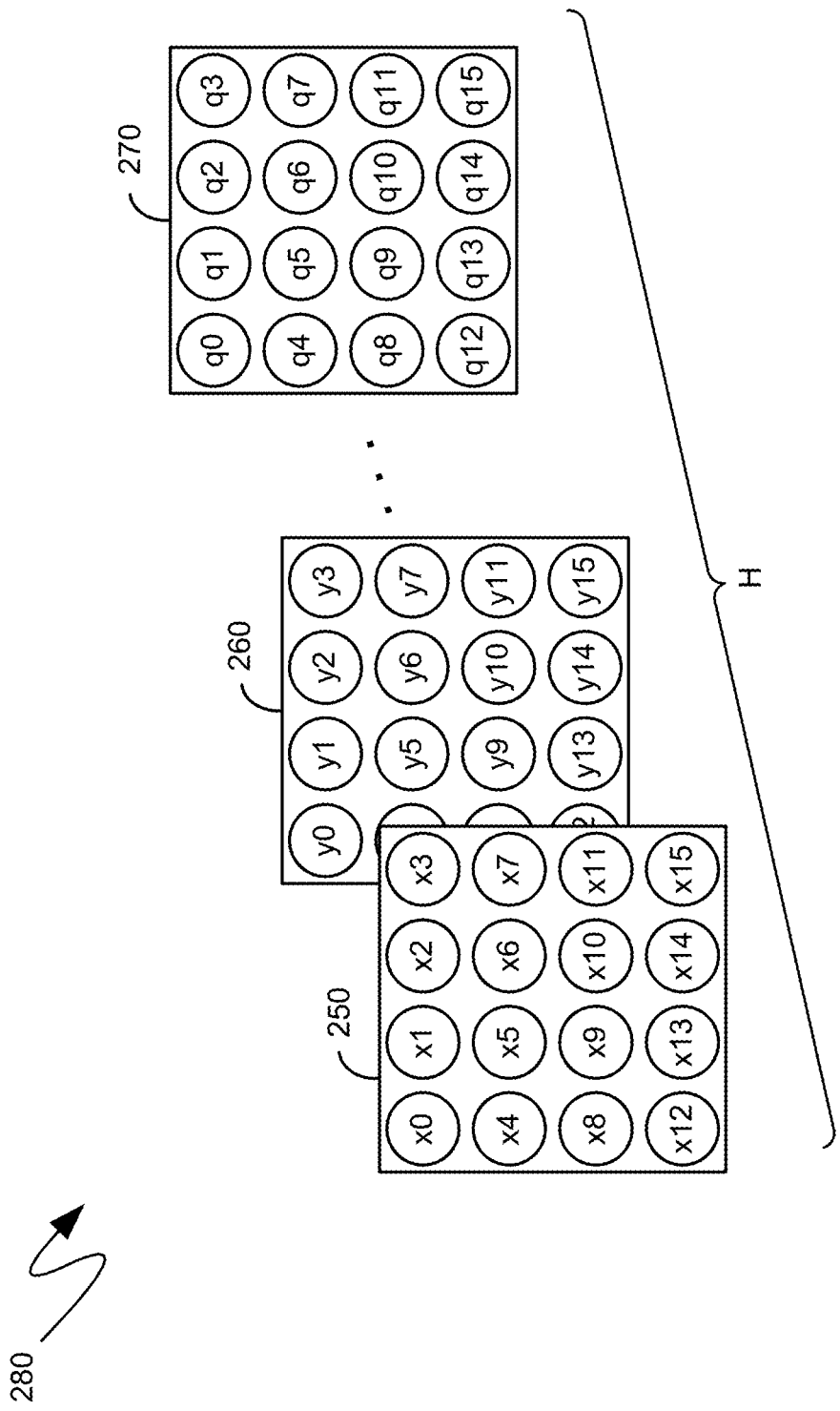

Such a process is illustrated in greater detail in FIGS. 2a-2d. More specifically, FIG. 2a shows an exemplary convolution of a volume, namely the exemplary volume 200, with a set of kernel weights, namely the exemplary kernel weights 241, to generate a first plane 250 of a second volume 280, that is shown in FIG. 2d. The exemplary first volume 200 can comprise three planes, namely the three exemplary planes 210, 220 and 230, with a nine-by-nine array of image data, for example. As indicated above, in the context of image data, the three exemplary planes can comprise a single plane of each of the colors red, green and blue. Each of a first set of kernel weights 241 can have an exemplary dimensionality of three-by-three-by-three.

As illustrated in FIG. 2a, data value x0 of an exemplary first plane 250 of the exemplary second volume 280 can be determined by multiplying every weight in the first set of kernel weights 241 with every pair-wise input element from the overlapping region of a first input volume, such as the overlapping regions 211, 221 and 231. According to one aspect, the data value x0 can be expressed as follows:

$$x0 = \begin{pmatrix} r0 & r1 & r2 \\ r9 & r10 & r11 \\ r18 & r19 & r20 \end{pmatrix} \begin{pmatrix} wr_{x0} & wr_{x3} & wr_{x6} \\ wr_{x1} & wr_{x4} & wr_{x7} \\ wr_{x2} & wr_{x5} & wr_{x8} \end{pmatrix} +$$

-continued $$\begin{pmatrix} g0 & g1 & g2 \\ g9 & g10 & g11 \\ g18 & g19 & g20 \end{pmatrix} \begin{pmatrix} wg_{x1} & wg_{x3} & wg_{x6} \\ wg_{x1} & wg_{x4} & wg_{x7} \\ wg_{x2} & wg_{x5} & wg_{x8} \end{pmatrix} +$$

$$\begin{pmatrix} b0 & b1 & b2 \\ b9 & b10 & b11 \\ b18 & b19 & b20 \end{pmatrix} \begin{pmatrix} wb_{x1} & wb_{x3} & wb_{x6} \\ wb_{x1} & wr_{x4} & wb_{x7} \\ wb_{x2} & wb_{x5} & wb_{x8} \end{pmatrix}$$

First set of kernel weights 241 can then slide by a quantity of horizontal data values of first volume 200 determined by the stride value. FIG. 2b illustrates a stride value of two. Thus, as illustrated in FIG. 2b, data value x1 of the exemplary first plane 250 of the exemplary second volume 280 can determined by multiplying every weight in the first set of kernel weights 241 with every pair-wise input element from a slid overlapping region of a second input volume, such as the exemplary slid overlapping region 212, 222 and 232. According to one aspect, the data value x1 can be expressed as follows:

$$x1 = \begin{pmatrix} r2 & r3 & r4 \\ r11 & r12 & r13 \\ r20 & r21 & r22 \end{pmatrix} \begin{pmatrix} wr_{x0} & wr_{x3} & wr_{x6} \\ wr_{x1} & wr_{x4} & wr_{x7} \\ wr_{x2} & wr_{x5} & wr_{x8} \end{pmatrix} +$$

$$\begin{pmatrix} g2 & g3 & g4 \\ g11 & g12 & g13 \\ g20 & g21 & g22 \end{pmatrix} \begin{pmatrix} wg_{x1} & wg_{x3} & wg_{x6} \\ wg_{x1} & wg_{x4} & wg_{x7} \\ wg_{x2} & wg_{x5} & wg_{x8} \end{pmatrix} +$$

$$\begin{pmatrix} b0 & b1 & b2 \\ b11 & b12 & b13 \\ b20 & b21 & b22 \end{pmatrix} \begin{pmatrix} wb_{x1} & wb_{x3} & wb_{x6} \\ wb_{x1} & wr_{x4} & wb_{x7} \\ wb_{x2} & wb_{x5} & wb_{x8} \end{pmatrix}$$

Such a process can continue, with the first set of kernel weights 241 sliding two horizontal values, in the illustrated example, of the exemplary first volume 200, with each iteration, until the first row of data values (x0, x1, x3, x3) of first plane 250 is complete. The first set of kernel weights 241 can then slide down, for example, two rows and back to the leftmost column of first volume 200 to calculate the second row of data values (x4, x5, x6, x7) of first plane 250. This process can continue until all four rows of data values of the first plane 250 are complete.

As illustrated in FIG. 2c, the exemplary data value y4 of the exemplary second plane 260 of second volume 208 can be determined by multiplying every weight in the second set of kernel weights 242 with every pair-wise input element from the down-slid overlapping region 213, 223 and 233. According to one aspect, the data value y4 can be expressed as follows:

$$y4 = \begin{pmatrix} r18 & r19 & r20 \\ r27 & r28 & r29 \\ r36 & r37 & r38 \end{pmatrix} \begin{pmatrix} wr_{y0} & wr_{y3} & wr_{y6} \\ wr_{y1} & wr_{y4} & wr_{y7} \\ wr_{y2} & wr_{y5} & wr_{y8} \end{pmatrix} +$$

$$\begin{pmatrix} g18 & g19 & g20 \\ g27 & g28 & g29 \\ g36 & g37 & g38 \end{pmatrix} \begin{pmatrix} wg_{y1} & wg_{y3} & wg_{y6} \\ wg_{y1} & wg_{y4} & wg_{y7} \\ wg_{y2} & wg_{y5} & wg_{y8} \end{pmatrix} +$$

$$\begin{pmatrix} b18 & b19 & b20 \\ b27 & b28 & b29 \\ b36 & b37 & b38 \end{pmatrix} \begin{pmatrix} wb_{y1} & wb_{y3} & wb_{y6} \\ wb_{y1} & wr_{y4} & wb_{y7} \\ wb_{y2} & wb_{y5} & wb_{y8} \end{pmatrix}$$

Such a process can continue until all data values of second plane 260 of second volume 280 are complete, and also continues for each of the H weight volumes to generate the H planes in of second volume 280. Referring again to FIG. 1, volume 106, determined such as in the manner illustrated by FIGS. 2a-2d, and detailed above, then becomes an input layer to convolutional layer 112, which can include K weight volumes to generate the K planes of volume 108.

According to one aspect, the values of the weights utilized in the convolutions detailed above can be derived as part of the "training" of a neural network. Typically, such training starts with initial weight values proceeds iteratively, where, for each iteration, the weight values are modified in accordance with information, such as gradient information, obtained during the processing of a prior iteration. As such, the training typically entails the performance of so-called "forward" processing, or forward propagation, and "backwards" processing, or backpropagation. More specifically, forward propagation of one or more input activations through the neural network can be utilized to generate output activations, which can be prediction. Then, gradients can be determined for each of the neurons in the neural network via back-propagation of "errors" from the output layer back to the input layer. Such gradients can then be utilized to update the weights at each neuron. Repetition of such processes can continue until the weights converge.

In gradient descent, several choices can be available for selecting a number of inputs to use per iteration. A first method, batch gradient descent, can utilize all available training data, such as, for example, pre-labeled images, in each iteration between weight updates. This method can be very expensive. A second method, stochastic gradient descent, can represent another extreme by selecting one random example from the corpus between weight updates. A third method, mini-batch gradient descent, can use a random subset of the corpus to perform gradient computation, followed by a single weight update.

In practice, mini-batch gradient descent can often be a good balance between training accuracy and training time. Furthermore, mini-batching can facilitate implementation of available parallelism in hardware, by allowing gradients for different inputs to be computed in parallel (without a serial dependence on weight updates). The remainder of this description will assume mini-batch gradient descent for training.

Figure 3:
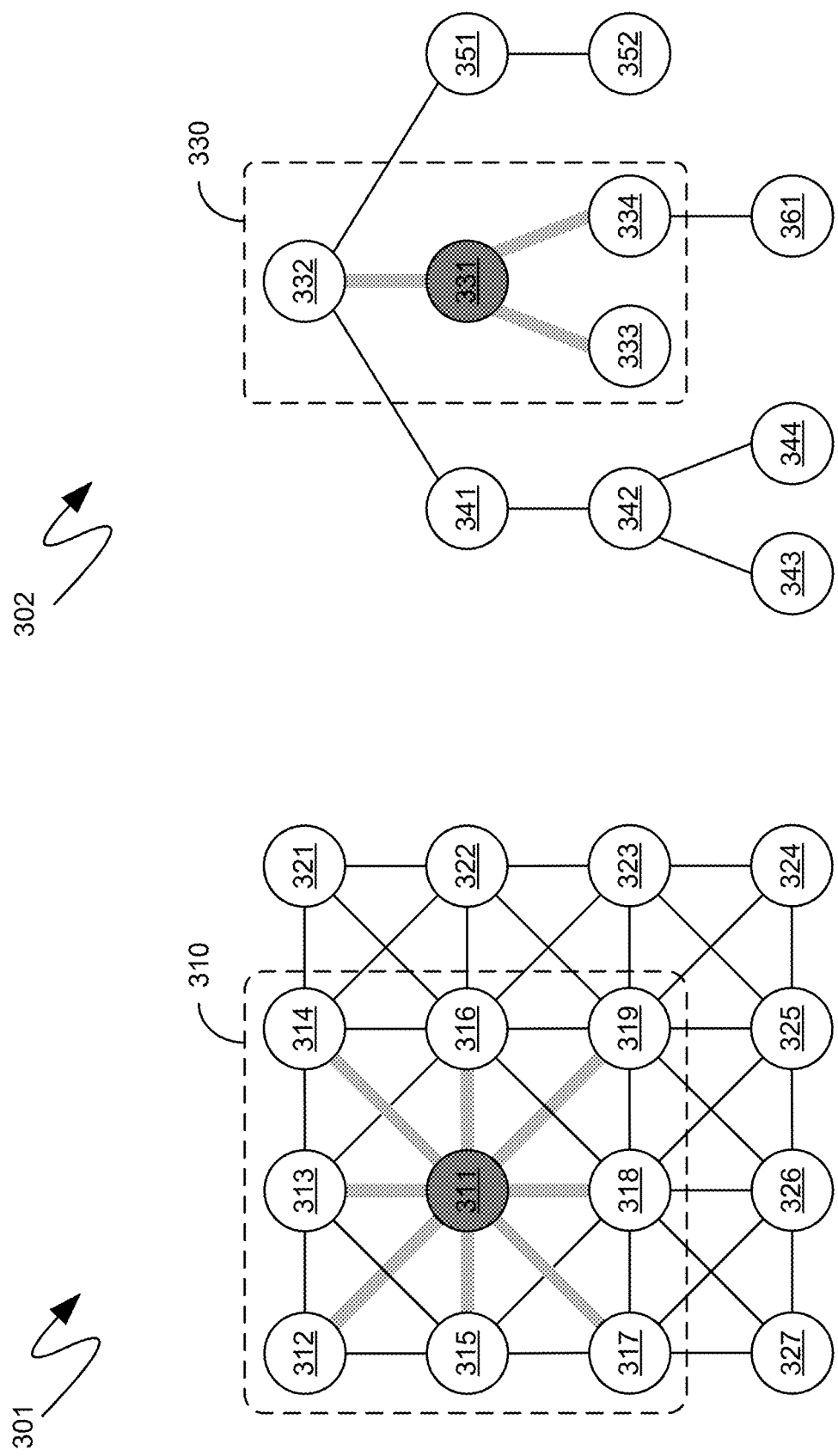
FIG. 3 is block diagram correlating neural networks to graph neural networks.

As can be seen from the above descriptions, a neural network, such as the exemplary convolution neural network described, can aggregate information from multiple "neighboring" data points as part of the convolving performed by a convolution layer. Turning to FIG. 3, the exemplary system 301 shown therein illustrates a portion of the exemplary plane 210, of the exemplary volume 200, that was shown in FIGS. 2a-2d and served as the basis for the detailed descriptions provided above. More specifically, the exemplary data points 312, 313, 314, 315, 311, 316, 317, 318 and 319 can be the nine-by-nine array of image data of the overlapping region 211 described in detail above, and shown in FIG. 2a. The lines between the exemplary data points illustrate proximity between data points, such as pixel values, within the two-dimensional array structure of the image data, for example. As such, the lines make visually explicit what is implicitly conveyed by the two-dimensional array structure itself: namely that data point 313 is adjacent to data point 311 because it is situated directly "above" it in the two-dimensional array structure, that the data point 316 is adjacent to the data point 311 because it is situated directly "next" to it in the two-dimensional array structure, and so on.

A graph neural network, such as a graph convolution network, can also aggregate information from multiple "neighboring" data points, except that "neighboring" data points are not defined based on their position, relative to other data points, within a two-dimensional array structure, but rather are defined based on the explicit edges between nodes in a graph. For example, the graph structure shown in exemplary system 302 can have a neighborhood 330, analogous to the neighborhood 310 of the exemplary system 301. In the exemplary system 301, the gray lines visually represent the closeness, within the two-dimensional array structure, of data points 312, 313, 314, 315, 316, 317, 318 and 319 to the data point 311, thereby forming the neighborhood 310. Similarly, in the exemplary system 302, the gray lines represent the links of the graph that explicitly connect data points 332, 333 and 334 to the data point 331, and thereby define the neighborhood 330.

Within the context of the descriptions provided below, the graph of the exemplary system 302 can represent a taxonomy of categorizations. As utilized herein, the term "taxonomy" means a collection of categories, in accordance with which an input is to be categorized, and the explicit relationships between those categories. As utilized herein, the term "taxonomy" can refer to, but does not require, a hierarchical arrangement. For example, the exemplary system 302 illustrates a hierarchical taxonomy, with the data point 332 representing a root category, and the data points 341, 331 and 351 each being leaf categories that are incrementally more specific than the root category. In turn, the category represented by the data point 331, for example, can have further leaf categories that are further incrementally more specific than the category represented by the data point 331. Such leaf categories can be represented by the data points 333 and 334 and the leaf category represented by the data point 334 can have a further, more specific, category represented by the data point 361. In a similar manner, the data point 341 can have a leaf category, represented by the data point 342, which can, in turn, have more specific categories represented by the data points 343 and 344. Likewise, the data point 351 can have a leaf category, represented by the data point 352. In a manner similar to the aggregation of values of neighboring pixels with the convolution detailed above, a graph neural network can aggregate information from neighboring nodes in the graph. In such a manner, as will be detailed below, the explicit relationships among various categories can be maintained and utilized to optimize the categorization performed by a neural network.

Graph neural networks include recurrent graph neural networks, convolution graph neural networks, graph autoencoders, spatial-temporal graph neural networks, and other like graph neural networks. Recurrent graph neural networks utilize recurrent neural architectures, which can assume that a node in a graph constantly exchanges information and/or messages with its neighbors until a stable equilibrium is reached. Convolution graph neural networks also are based on this concept of message/information passing between nodes. More specifically, in a convolution graph neural network, the value of a node one iteration can be based on an aggregation of the value of that node during a prior iteration with the values of that node's neighbors in the graph.

Figure 4:
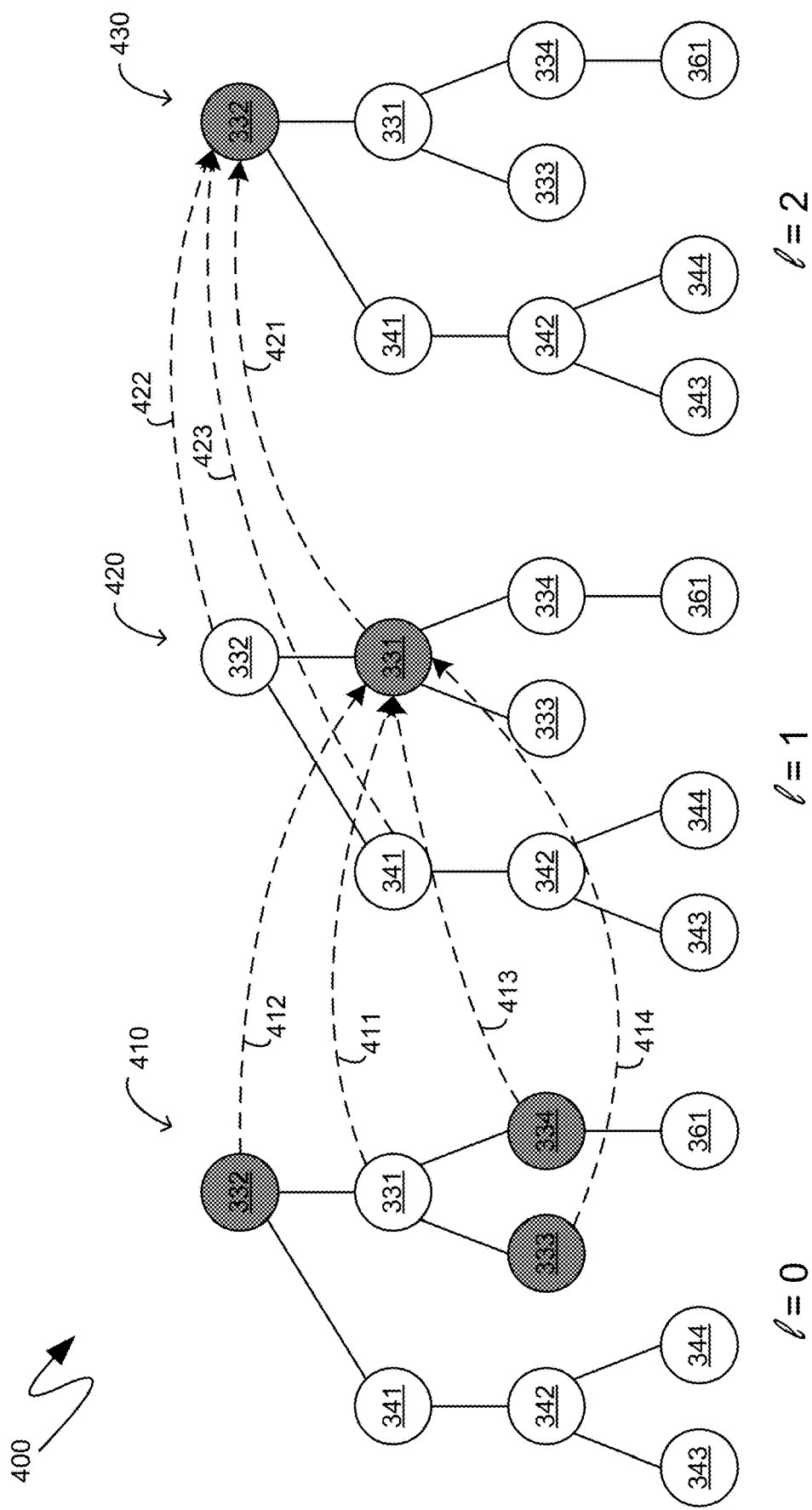
FIG. 4 is a system diagram of an exemplary propagation of information through multiple iterations of a graph neural network.

Turning to FIG. 4, the exemplary system 400 shown therein illustrates three iterations of a graph, with the version of the graph 410 being one iteration, the version of the graph 420 being an immediately subsequent iteration, and with the version of the graph 430 being an iteration subsequent to the iteration of the version 420. The graph represented by the versions 410, 420 and 430 can be a portion of the graph of the system 302 shown in FIG. 3 and, as such, the individual nodes of the graph retain numbering assigned to them in FIG. 3. As can be seen, information from the nodes adjacent to the node 331, namely the nodes 332, 333 and 334, (as well as information from the node 331 itself) can be propagated into the node 331 at an immediately subsequent iteration, as represented by the dashed lines 412, 413 and 414. An analogous propagation can occur, for each of the other nodes, from their neighboring nodes. Thus, for example, although not explicitly illustrated, information from the nodes 341, 343 and 344 can be propagated into the node 342, and, bi-directionally, information from the node 342 can be propagated to each of the nodes 341, 343 and 344. In addition to the propagation of information from the adjacent nodes, the value of node 331 in a subsequent iteration can also be based on information present in the same node 331 in a prior iteration. As such, dashed line 411 illustrates the self-connection of information from node 331 in a prior iteration to the same node 331 in a subsequent iteration. Returning to FIG. 4, in a subsequent iteration information from node 331 can be propagated to the node 332. The propagation from node 331 to node 332 in a subsequent iteration is illustrated by the dashed line 421. In addition, analogously to that described with reference to node 331, node 331 can receive information from other adjacent nodes, such as node 341, as illustrated by the dashed lines 422, as well as from itself in a prior iteration, as illustrated by the dashed lines 422.

As can be seen, the goal of context/information diffusion is to propagate information across the graph. In this way, a node can be provided with knowledge about its wider surroundings rather than being restricted to its immediate neighborhood. The way in which context is diffused by iterative and local methods is visually illustrated by the shading in FIG. 4, which proceeds from nodes 332, 333 and 334 in one iteration, to node 331 in a subsequent iteration, and then on to node 332 in a still subsequent iteration. By iteratively computing local aggregation of neighboring features, a node can indirectly be provided with information from nodes farther away in the graph.

Figure 5:
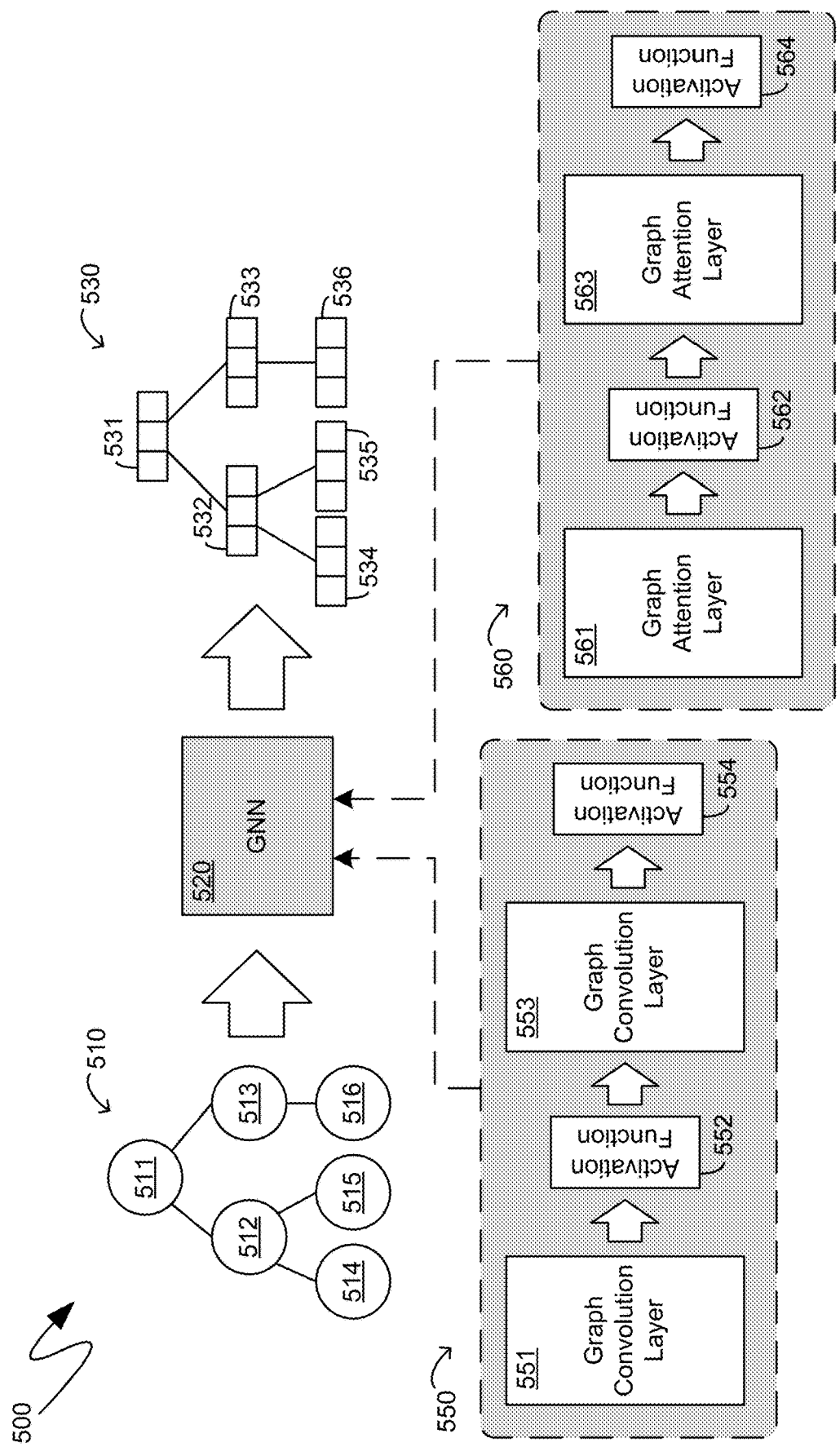
FIG. 5 is a system diagram of an exemplary graph neural network.

Turning to FIG. 5, the exemplary system 500 shown therein illustrates a general operation of a graph neural network, such as the exemplary graph neural network 520. The exemplary graph neural network 520 can receive as input a graph, such as the exemplary graph 510, which can comprise information encapsulated in nodes, such as the exemplary nodes 511, 512, 513, 514, 515 and 516, as well as information encapsulated in the edges providing explicit relationship links between the nodes, such as the edges of the exemplary graph 510. The graph neural network 520 can, such as based on the processing described in detail above, generate output corresponding to individual ones of the nodes of the input graph. In generating such output, the graph neural network 520 can retain the node-and-edge structure of the input graph, such as the exemplary input graph 510. For example, the exemplary output graph 530 can comprise output 531, 532, 533, 534, 535 and 536 that are arranged relative to one another in an equivalent manner to the arrangement of the nodes 511, 512, 513, 514, 515 and 516, respectively of the input graph 510. The exemplary output 531, 532, 533, 534, 535 and 536 can comprise numerical values formatted as multidimensional vectors, matrices, or other like data structures.

One type of graph neural network can be a graph convolution neural network that can comprise convolution layers, such as those detailed previously, and activation functions. For example, the exemplary graph convolution neural network 550 comprises a graph convolution layer 551 whose output can be provided to an activation function, such as the exemplary activation function 552. As described above, an activation function can be a nonlinear transformation, such as the aforementioned sigmoid or tanh functions. Another common activation function can be a Rectified Linear Unit (ReLU), which, when graphed, appears as a ramp and is traditionally defined as being zero if the input is negative, or, if the input is positive, then the output is some weighted or unweighted version of the input. In the exemplary graph convolution neural network 550, the output of the exemplary activation function 552 can be provided to a further graph convolution layer 553, whose output can then also be provided to a further activation function, such as the exemplary activation function 554.

Another type of graph neural network can be a graph attention neural network that can comprise attention layers and activation functions, such as the activation functions detailed above. For example, the exemplary graph attention neural network 560 comprises a graph attention layer 561 whose output can be provided to an activation function, such as the exemplary activation function 562. Unlike the graph convolution layers detailed above, where weight values are determined based on a tuning of the overall network and are essentially equivalent for the nodes within a neighborhood, a graph attention layer, such as the exemplary graph attention layer 561, can determine weight values based both on tunable aspects and also based on the values of the individual nodes themselves such that different neighboring nodes can have different weights applied to their values. The output of the exemplary graph attention layer 561 can be provided to an activation function, such as that detailed above. In the exemplary graph attention neural network 560, the output of the exemplary activation function 562 can then be provided to a further graph attention layer 563, whose output can then also be provided to a further activation function, such as the exemplary activation function 564.

Having provided the relevant background for neural network processing and graph neural network processing, the description proceeds with aspects by which neural network categorization accuracy is improved with categorical graph neural networks.

Figure 6:
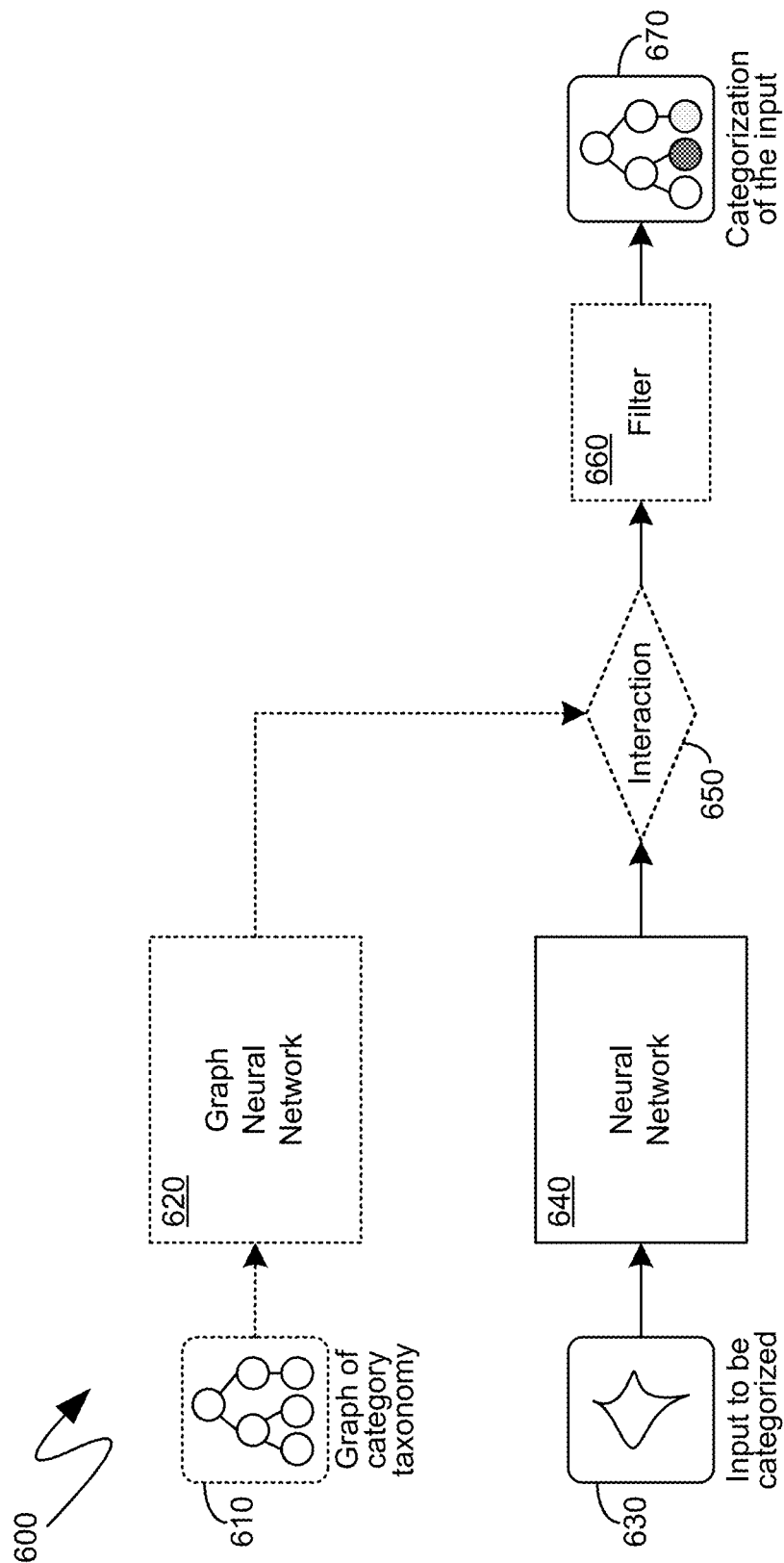
FIG. 6 is a system diagram of an exemplary system that can incorporate a graph neural network into a neural network-based categorization.

Turning to FIG. 6, the system 600 shown therein illustrates one aspect by which neural network categorization accuracy is improved with a categorical graph neural network, such as the exemplary graph neural network 620. More specifically, an existing neural network categorization system is graphically represented with solid lines in FIG. 6, while the incorporation of a categorical graph neural network is graphically represented with dashed lines. Turning first to the solid-line elements by themselves, in a neural network categorization system, input to be categorized, such as the exemplary input 630, is provided to a neural network, such as the exemplary neural network 640. The exemplary neural network 640 can be a convolution neural network, such as that detailed above. Initially, a neural network, such as the exemplary neural network 640, can be trained based upon training input and a corresponding category into which such training input is properly categorized. Based on such training, the exemplary neural network 640 can determine the values of weight parameters that can be utilized for subsequent categorization. Accordingly, when the exemplary input 630 is provided, the neural network 640 can process such input 630 in accordance with the values of weight parameters that were established during the training process. Again, focusing only on the elements of an existing neural network categorization system, graphically represented with solid lines, and setting aside the elements and communications shown with dashed lines in FIG. 6, the output 670 of the neural network 640 can be the categorization of the input 630 into one or more categories, or classifications.

To convert text to numerical values that can be processed, such as by the exemplary neural network 640, known semantic conversion mechanisms, such as FastText, can be utilized. For example, FastText can convert one or more words, having a specific semantical meaning, into a multidimensional vector. In one iteration, the multidimensional vector can be a vector in three hundred dimensions. In a similar manner, categories, such as the words utilized to title or describe each category, can also be converted into a multidimensional vector. According to another aspect, since all of the categories in the taxonomy are known in advance, each category can be represented with an integer or other single-dimensional data structure. The exemplary neural network, 640 can then be trained by providing, as training input, the multidimensional vector into which the linguistic input to be categorized was converted by the semantic conversion mechanism, and then also providing, as a training output, the value corresponding to a categorization of the input into the category into which the training input was previously properly categorized. The weight values of the neural network 640 are then automatically adjusted such that numerical input equivalent to that of the training input results in numerical output equivalent to that of the training output. Thus, for example, if the input to be categorized was a user search query, then the training input can be a numerical value of a known user search query, after the known user search query was converted by the semantic conversion mechanism. Similarly, the training output can also be a numerical value, namely the numerical value corresponding to a pre-determined correct category into which such a known user search query would properly be categorized. As another example, if the input to be categorized is a book, then the book's title can be converted into a numeric value by a semantic conversion mechanism, such as FastText, and such a numeric value can be provided as the training input, while the training output can be a numerical value corresponding to a categorization of the book into the category into which such a book would properly be categorized.

As indicated previously, the categorization provided by the exemplary neural network 640 is suboptimal because the exemplary neural network 640 cannot be trained with, and thus has no knowledge of, relationships between possible categories. For example, the exemplary neural network 640 can be trained with a training input query "Sidney Corderman amplifier" (which, as indicated, would be converted to a multidimensional vector utilizing a semantic conversion mechanism and then provided as training input to the neural network 640) and a training output categorization "Home Audio Tube Amplifiers" (which, again, would be in the form of a multidimensional vector having a value of one for the dimension corresponding to the "Home Audio Tube Amplifiers" category and zero values for the other dimensions corresponding to other categories). Another training input, such as, for example, "Tom Colangelo amplifier" might be trained with a corresponding training output categorization "Home Audio Solid-State Amplifiers". To a human, the relationship between the category "Home Audio Tube Amplifiers" and the category "Home Audio Solid-State Amplifiers" is immediately apparent. However, since the training data utilized to establish the values of the weights of the neural network 640 does not contain any explicit indicators of relationship, from the perspective of the establishment of the weight values of the neural network 640, and, thus, from the perspective of the categorization performed by the neural network 640, the category "Home Audio Solid-State Amplifiers" is no more or less related to the category "Home Audio Tube Amplifiers" than, for example, the category "Three-Rack Dishwashers".

According to one aspect, the categorization provided by the neural network 640 can be improved by incorporating a graph neural network into the neural network categorization system. Within the exemplary system 600, shown in FIG. 6, the incorporation of a graph neural network is illustrated by components and elements that are visually indicated with dashed lines. More specifically, in addition to the exemplary neural network 640, a graph neural network, such as the exemplary graph neural network 620 can also be trained and then utilized to improve the categorization provided by the system 600. In particular, as with the exemplary neural network 640, the output of the exemplary graph neural network 620 can be in the form of a multidimensional data structure, such as a vector or matrix. More specifically, the output of the exemplary graph neural network 620 can comprise a multidimensional data structure for each node, or for one or more specific nodes, of the input graph 610. Such output can interact with the output of the exemplary neural network 640 via the interaction 650. According to one aspect, the interaction 650 can be a dot product between each vector, corresponding to a node, that is generated as output of the exemplary graph neural network 620 and a vector generated as output of the exemplary neural network 640. Such a dot product interaction 650 can compare the vector similarity between the vectors corresponding to the nodes of the graph 610, which are generated as output of the exemplary graph neural network 620, and the vector generated as output of the exemplary neural network 640, thereby incorporating into the categorization performed by the system 600 information that takes into account the explicit relationship between categories defined by the category taxonomy which, in graph form, is input into the graph neural network 620. In the case where the exemplary interaction 650 is a dot product, such an interaction can result in numerical values corresponding to each of the nodes of the input graph 610, with the larger numerical values indicating a greater similarity between the vector output by the neural network 640 and the vector, output by the graph neural network 620, corresponding to a given node.

The output of the interaction 650 can also be a multi-dimensional data structure, such as a vector, with each dimension of the vector corresponding to one of the nodes of the graph 610. As such, the dimensionality of the data output by the interaction 650 can depend on the quantity of nodes in the graph 610. Therefore, the dimensionality of the data output by the interaction 650 can be unrelated to the dimensionality of the data output by the neural network 640 and the graph neural network 620. For example, the output of the neural network 640 can be a single 300-dimension vector and the output of the graph neural network 620 can be multiple 300-dimension vectors, each vector corresponding to one of the nodes of the graph 610. The interaction 650, can then, for example, take the form of multiple dot products, each being between one of the 300-dimension vectors output by the graph neural network 620, and the single 300-dimension vector output by the neural network 640. The value of each dot product can then be associated with a single dimension of another multi-dimensional data structure. For example, the value generated by performing the dot product of the 300-dimension vector output by the neural network 640 and the 300-dimension vector corresponding to a first node of the graph 610 (as output by the graph neural network 620) can be stored in a first dimension of a vector output by the interaction 650. Then, the value generated by performing the dot product of the 300-dimension vector output by the neural network 640 and the 300-dimension vector corresponding to a second node of the graph 610 (as output by the graph neural network 620) can be stored in a second dimension of a vector output by the interaction 650, and so on. If the graph 610 comprised 2000 different nodes, representing 2000 different categories, then the output of the interaction 650 can be a 2000-dimension vector. In other words, the values of a specific dimension of the data structure output by the interaction 650 can correspond to the value generated by the dot product of the vector generated by the neural network 640 and the vector, corresponding to a node whose category corresponds to that specific dimension, generated by the graph neural network 620. The output of the interaction 650 can then be provided to a filter, such as the exemplary filter 660.

As one example, the exemplary filter 660 can be a softmax function which normalize the values output by the interaction 650. For example, the values of the dimensions of the multi-dimensional output generated by the interaction 650 can be normalized such that the sum of all of the values equals a value of one. The categorization 670 of the input 630 can then be based on the category corresponding to a node whose corresponding dimension in the filtered multi-dimensional output is closest to a value of one. As another example, the exemplary filter 660 can be a sigmoid function, which can adjust the values of the dimensions of the multi-dimensional output of the interaction 650 to be between zero and one. The largest (or smallest, depending on which extreme is relevant) two or more values can then be utilized to provide a categorization 670 that categorizes the input 630 into two or more categories. For example, if the interaction 650 is a dot product, then such a sigmoid function can adjust the resulting dot product values, corresponding to the nodes of the graph 610, to be between zero and one. A value close to zero can signify that the vector corresponding to such a node, output by the graph neural network 620, was quite dissimilar from the vector output by the neural network 640. By contrast, a value close to one can signify a high degree of similarity between the vector output by the neural network 640 and the vector, corresponding to a node, output by the graph neural network 620. If multiple nodes of the graph 610 have corresponding vectors, as output by the graph neural network 620, that are similar to the vector output by the neural network 640, then multiple dot product values will be high and/or have a value close 1.0 after the application of the sigmoid function as part of the exemplary filter 660. In such an instance, a determination can be made that the input 630 can be categorized into two or more categories, namely the categories represented by nodes whose corresponding values are greater than a threshold.

According to another aspect, the interaction 650 can, itself, be performed with machine learning mechanisms, such as those detailed above. The utilization of such machine learning mechanisms to perform the interaction 650 can enable the dimensionality of data output by the graph neural network 620 to differ from the dimensionality of data output by the neural network 640.

As indicated, the input to the exemplary graph neural network 620 can be a graph, such as the exemplary graph 610, that comprises the category taxonomy. Such a graph of a category taxonomy can comprise nodes that correspond to individual categories within the category taxonomy, and can further comprise links between the nodes that represent explicit relationships between the categories. For example, one node can correspond to the category "Home Audio Tube Amplifiers", a second node can correspond to the category "Home Audio Solid-State Amplifiers" and a third node can correspond to the root category "Home Audio Amplifiers". A graph of such a category taxonomy can then include one link from the root category "Home Audio Amplifiers" to the leaf category "Home Audio Tube Amplifiers", and another link from the root category "Home Audio Amplifiers" to the leaf category "Home Audio Solid-State Amplifiers", thereby providing an explicit relationship between the three categories.

The graph 610 can be processed by the graph neural network 620 in the manner detailed above. More specifically, the words associated with each node, such as the title or description of the category corresponding to a node, can be converted into a numerical value utilizing a semantic conversion mechanism such as that detailed above. According to one aspect, the same semantic conversion mechanism can be utilized for the wording of the graph 610 and for the input 630. Alternatively, the values assigned to the nodes can be integer values corresponding to specific categories, such as detailed above. In addition to the title or description of individual categories, which are represented within the graph 610 as individual nodes, the input of the graph 610, to the graph neural network 620, can further comprise numeric indicators of the links, such as by specifying beginning and ending nodes of links.

According to one aspect, the exemplary graph neural network 620 can comprise two neural network layers, such as two convolution graph neural network layers. According to other aspects, a greater or fewer quantity of neural network layers may be utilized. A known phenomenon in graph neural networks, however, is that too many neural network layers can result in information flowing into a node from nodes that are too far apart within the graph and, consequently, providing sub optimal results.

Each neural network layer, of the exemplary graph neural network 620, can comprise weights whose values can be applied to the individual neurons of the graph neural network 620, such as in the manner detailed above. The values of those weights can be trained together with the training of the exemplary neural network 640. For example, a training input can be provided in the form of the multidimensional vector into which the linguistic input that is to be categorized was converted by the semantic conversion mechanism. Analogously, a training output can also be provided, with the training output being a value corresponding to the predetermined correct categorization of the training input. For example, the training output can be a multi-dimensional data structure, such as a vector, whose dimensions can comprise zero values, with the exception of the dimension, corresponding to the node, corresponding to the category into which the training input has already been determined to be properly categorized. Such a dimension can comprise a value of one. The weight values of the neural network 640 and the weight values of the graph neural network 620 are then automatically adjusted such that numerical input equivalent to that of the training input results in numerical output equivalent to that of the training output.

Figure 7:
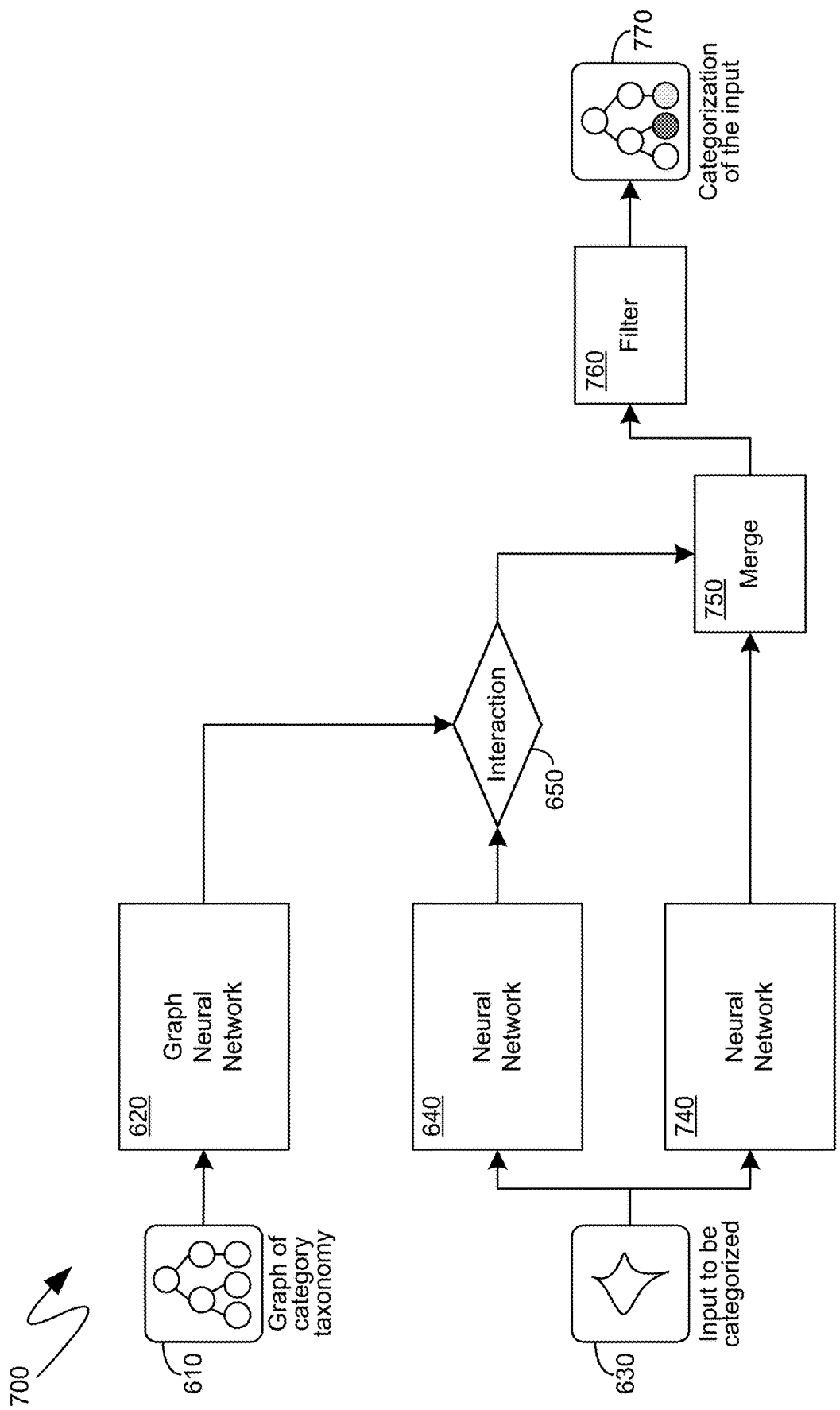
FIG. 7 is a system diagram of another exemplary system that can incorporate a graph neural network into a neural network-based categorization.

Turning to FIG. 7, the exemplary system 700 shown therein illustrates another manner in which neural network based categorization accuracy can be improved by incorporating categorical graph neural networks. More specifically, and as can be seen from the exemplary system 700, a graph neural network, such as the exemplary graph neural network 620, can generate output that can interact with the output generated by a neural network, such as the exemplary neural network 640, to which was provided input 630 that is to be categorized. In the exemplary system 700, the output of the interaction 650, detailed above with reference to exemplary system 600 a FIG. 6, is further merged, or amalgamated, with output of another neural network, namely the exemplary neural network 740. The exemplary merge 750 can be a vector addition, such as by adding the vector output from the interaction 650 with the vector output by the neural network 740, or other like amalgamation of two multidimensional sets of data. Accordingly, the dimensionality of the output of the neural network 740 can be established based on a dimensionality of an output of the interaction 650, which, as detailed above, can differ from the dimensionality of the output of the neural network 640 and the graph neural network 620. Such differences in dimensionality can be accounted for as part of the setup and training of the neural network layers of the neural network 740, the neural network 640 and the graph neural network 620. As before, a categorization 770 of the input 630 can be based on the values of individual dimensions of the output, in this case, of the exemplary merge 750, after an appropriate filtering 760. According to one aspect, the filter 760 can be of the same form as the filter 660 detailed above.

In some instances, the interaction 650 can deemphasize certain dimensions or aspects of the output of the exemplary neural network 640. In such instances, the merge 750 can re-emphasize such dimensions or aspects since the output of the exemplary neural network 740 is not affected by the output of the graph neural network 620. Alternatively, or in addition, the exemplary neural network 740 can provide information that was never part of the exemplary neural network 640, and the merge 750 can enable such additional information to affect the values upon which the categorization 770 is based and, thereby, influence the categorization 770.

According to one aspect, the exemplary neural network 640 can be equivalent to the exemplary neural network 740. For example, the exemplary neural network 640 can comprise weights having equivalent values to the weights of the exemplary neural network 740. According to another aspect, however, the weights of the exemplary neural network 640 can be adjusted independently of the weights of the exemplary neural network 740. Similarly, the exemplary neural network 640 can comprise a different quantity of neural network layers than the exemplary neural network 740. In such another aspect, the tuning of the exemplary neural network 740 can occur together with the tuning of the exemplary neural network 640 and the exemplary graphical network 620, such as in the manner detailed previously. The values of the weights of each of the neural network layers of the exemplary neural network 740, the exemplary neural network 640 and the exemplary graphical network 620 can be established based on the training input and output data such that, for subsequent input, such as the exemplary input 630, a categorization 770 of such an input can be generated by the exemplary system 700.

Figure 8:
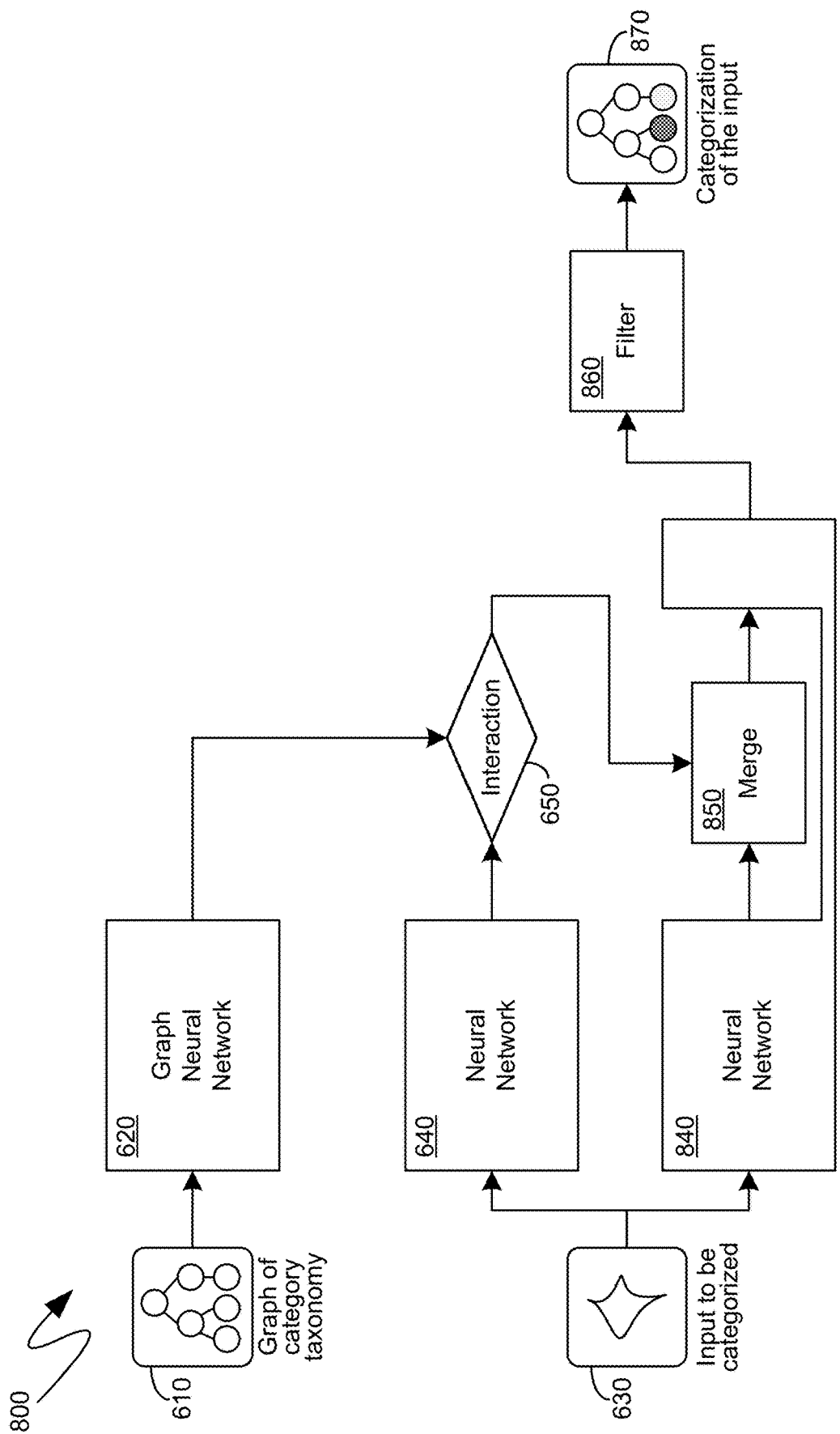
FIG. 8 is a system diagram of another exemplary system that can incorporate a graph neural network into a neural network-based categorization.

In some instances, it may be beneficial to perform further neural network processing subsequent to the merge 750. For example, according to one aspect, one or more layers of the exemplary neural network 740 can receive as input the output of the merge 750. Turning to FIG. 8, the exemplary system 800 shown therein illustrates such an exemplary system. More specifically, the exemplary neural network 840 can comprise one or more neural network layers whose output is provided to a merge, such as the exemplary merge 850, which can merge such output with the output of the interaction 650. The merge 850 can operate in a manner analogous to that of the merge 750, detailed previously. In the exemplary system 800, however, the output of the merge 850 can be provided to one or more still further neural network layers of the exemplary neural network 840. The output of those further one or more neural network layers can then be filtered by the filter 860 and the categorization 870 can be based on such filtered output.

As with the exemplary system 700, in the exemplary system 800, the exemplary neural network 840 can comprise a different quantity of layers than the exemplary neural network 640 and the values of the weights utilized by the neural network layers of the exemplary neural network 840 can differ from the values of the weights utilized by the neural network layers of the exemplary neural network 640. Additionally, as with the exemplary system 700, in the exemplary system 800, the dimensionality of the data processed by the exemplary neural network 840 can be established in accordance with the dimensionality of the output of the interaction 650. In a manner analogous to that detailed above, the provision of training input and output to the exemplary system 800 can result in the automated establishment of the values of the weights utilized by the different neural network layers of the exemplary neural network 640, the exemplary neural network 840, and the values of the weights utilized by the different graph neural network layers of the exemplary graph 620.

Figure 9A:
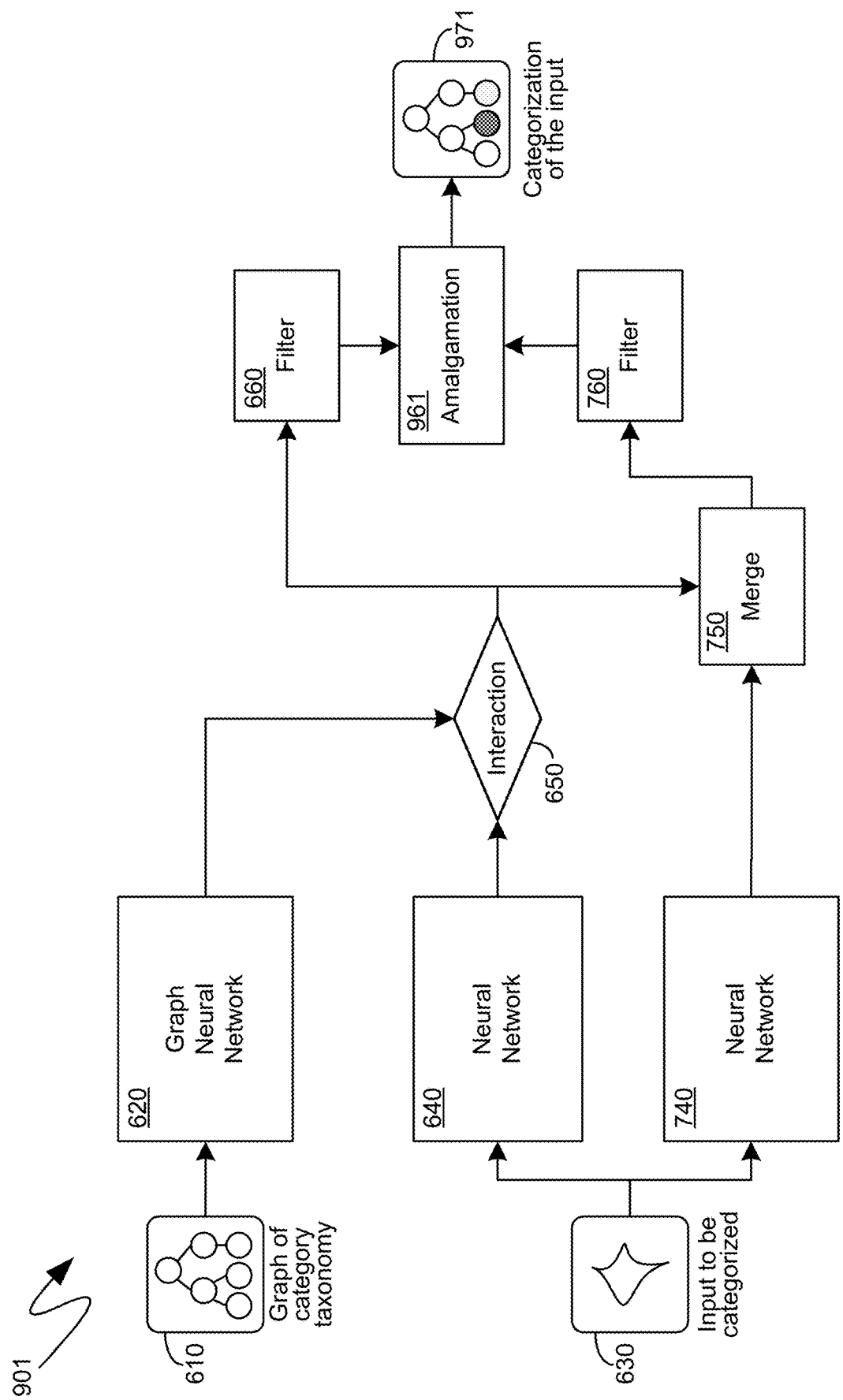
FIGS. 9a-9c are system diagrams of exemplary permutations of combinations of the systems of FIGS. 6-9.

Permutations of combinations of the systems 600, 700 and 800, illustrated in FIGS. 6, 7 and 8, respectively, can also be utilized to improve neural network-based categorization accuracy with categorical graph neural networks. For example, the exemplary system 901 shown in FIG. 9a illustrates an exemplary combination of the system 600 of FIG. 6 and the system 700 of FIG. 7. More specifically, the output of the interaction 650, detailed previously, can be provided to the merge 750, also detailed previously, and can also be separately available for subsequent amalgamation with the output of the merge 750. More specifically, the output of the filter 660, which was generated and utilized by the system 600 to perform the categorization 670, can, in the exemplary system 901 of FIG. 9a, instead, be provided to an amalgamation 961 which can amalgamate the output of the exemplary filter 660 with the output of the exemplary filter 760, which was generated and utilized by the system 700 to perform the categorization 770. According to one aspect the amalgamation 961 can add the values for corresponding to individual nodes of the graph 610, as output by the filters 660 and 760, in equal weight. According to another aspect, however, the amalgamation 961 can weight the output of the filter 660 differently from the output of the filter 760. For example, empirical evidence suggests that weighting the output of the filter 660 such that it contributes less than 10% can be disadvantageous, and, conversely, that the weighting of the output of the filter 660 should be greater than 10%.

The weights applied, by the amalgamation 961, to the output of the filter 660 and/or the output of the filter 780 can, themselves, be a learnable parameter, much like the weight values of the neural network layers and graph neural network layers detailed above. As such, the weights applied by the amalgamation 961 can be tuned as part of the training process detailed previously, together with the weight values of the exemplary neural networks 640 and 740 and the exemplary graph neural network 620. The categorization 971 of an input 630 can then be performed based in the values output by the amalgamation 961.

Figure 9B:
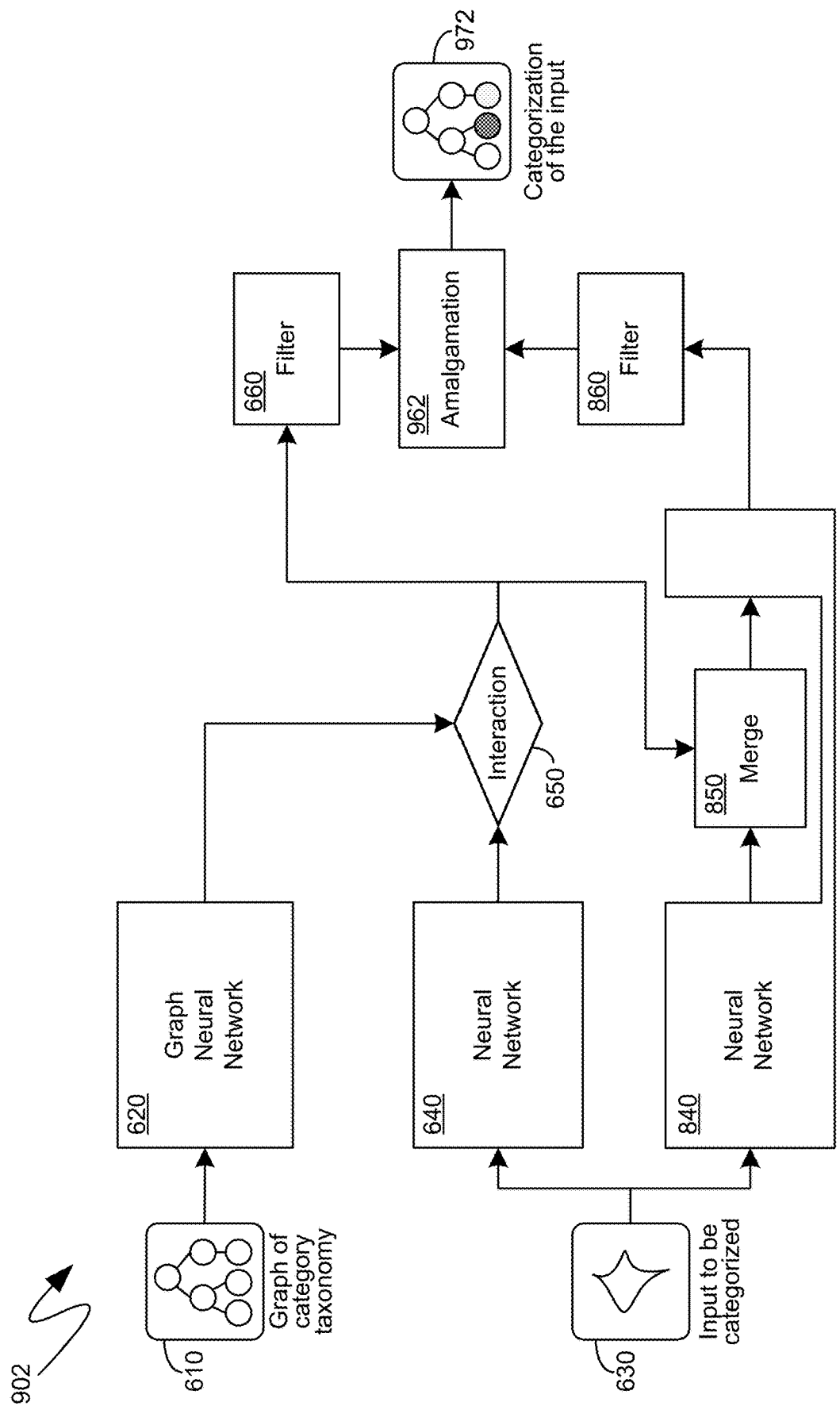

The exemplary system 902, shown in FIG. 9b, illustrates an exemplary combination of the system 600 of FIG. 6 and the system 800 of FIG. 8. Like the exemplary system 901, the exemplary system 902 provides the output of the filter 660 to an amalgamation, in this case the exemplary amalgamation 962, which also receives the output of the filter 860, which was generated and utilized by the system 800 to perform the categorization 870. As with the amalgamation 961, the amalgamation 962 can amalgamate, such as by adding, the output of the filters 660 and 860 in equal weight, or it can weigh the output of the filter 660 differently from the output of the filter 860. Similarly, as with the amalgamation 961, the weights applied by the amalgamation 962 can be learnable parameters, and, as such, can be tuned as part of the training process detailed above.

Figure 9C:
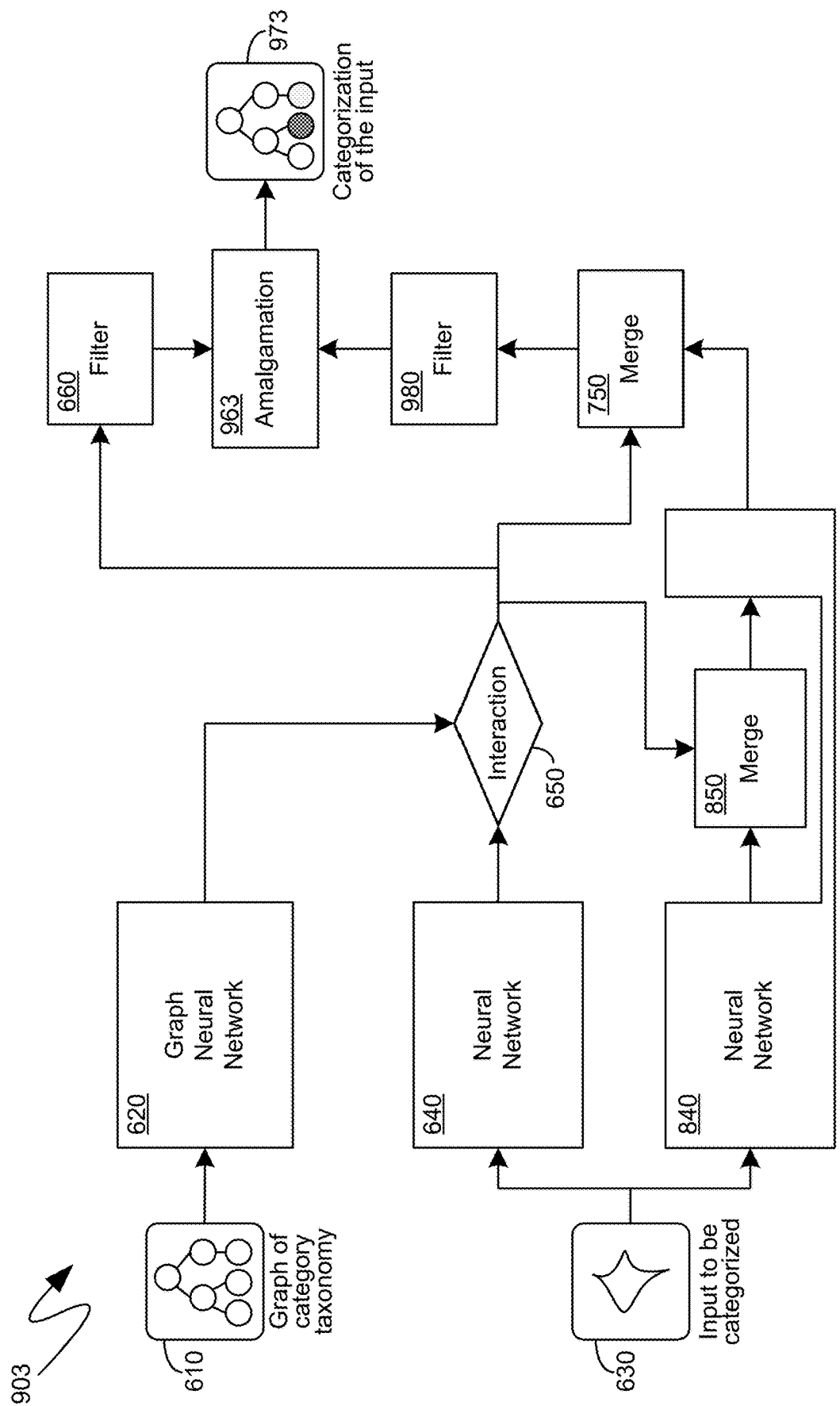

Turning to FIG. 9c, the exemplary system 903 shown therein illustrates an exemplary combination of the system 600 of FIG. 6, the system 700 of FIG. 7 and the system 800 of FIG. 8. More specifically, the output of the interaction 650 can be: (1) provided to the merge 850, whose output can still be processed by still further neural network layers of the exemplary neural network 840, (2) provided to the merge 750, which can merge the output of the interaction 650 with the output of the neural network 840, in a manner analogous to the merging of the output of the interaction 650 with the output of the neural network 740 detailed above with reference to the system 700 of FIG. 7, and (3) provided to the filter 660, such as in the manner detailed above with reference to system 600 FIG. 6. The output of the merge 750 can be filtered by the filter 980 in a manner analogous to that detailed above, such as with respect to the filter 660. The output of the filter 660 and the filter 980 can then be amalgamated by the amalgamation 963, which can be analogous to the amalgamation 961 of FIG. 9a and the amalgamation 962 of FIG. 9b. More specifically, the amalgamation 963 can amalgamate, such as by adding, the multidimensional vectors output by the filters 660 and 980 in equal weight, or it can weight the output of the filter 660 differently from the output of the filter 980. Similarly, as with the amalgamations 961 and 962, the weights applied by the amalgamation 963 can be learnable parameters, and, as such, can be tuned as part of the training process detailed above.

The systems described above and illustrated in FIGS. 6, 7, 8 and 9a-9c establish mechanisms by which the neural network-based categorization of an input into one or more categories of a category taxonomy can be improved with the utilization of graph neural networks that receive, as input, the category taxonomy in the form of a graph. Once the above described training process is complete, the runtime of any one or more of the systems 600, 700, 800, 901, 902 and/or 903 can entail the receipt of input to be categorized, and the subsequent generation of the categorization of such an input based upon the values of the weights of the neural network layers, the graph neural network layers and/or the amalgamations of alternative output paths.

However, in addition to improving the categorization of input, the established weight values applied to one or more layers of the graph neural network, such as the exemplary graph neural network 620, can provide further benefits. More specifically, such weight values can enable an analysis of how information flows through the graph. Additionally, as another benefit, the trained system can enable the identification of similar categories that may not be explicitly related in the category taxonomy. For example, if two or more different categories often appear with similar values in the output that is utilized to perform the categorization, then such different categories can be identified as being similar, irrespective of their relative positions within the category taxonomy. Similarly, if two or more different categories often appear with similar values in intermediate layers of the graph neural network, then such different categories can be identified as being similar, irrespective of their relative positions within the category taxonomy.

Figure 10:
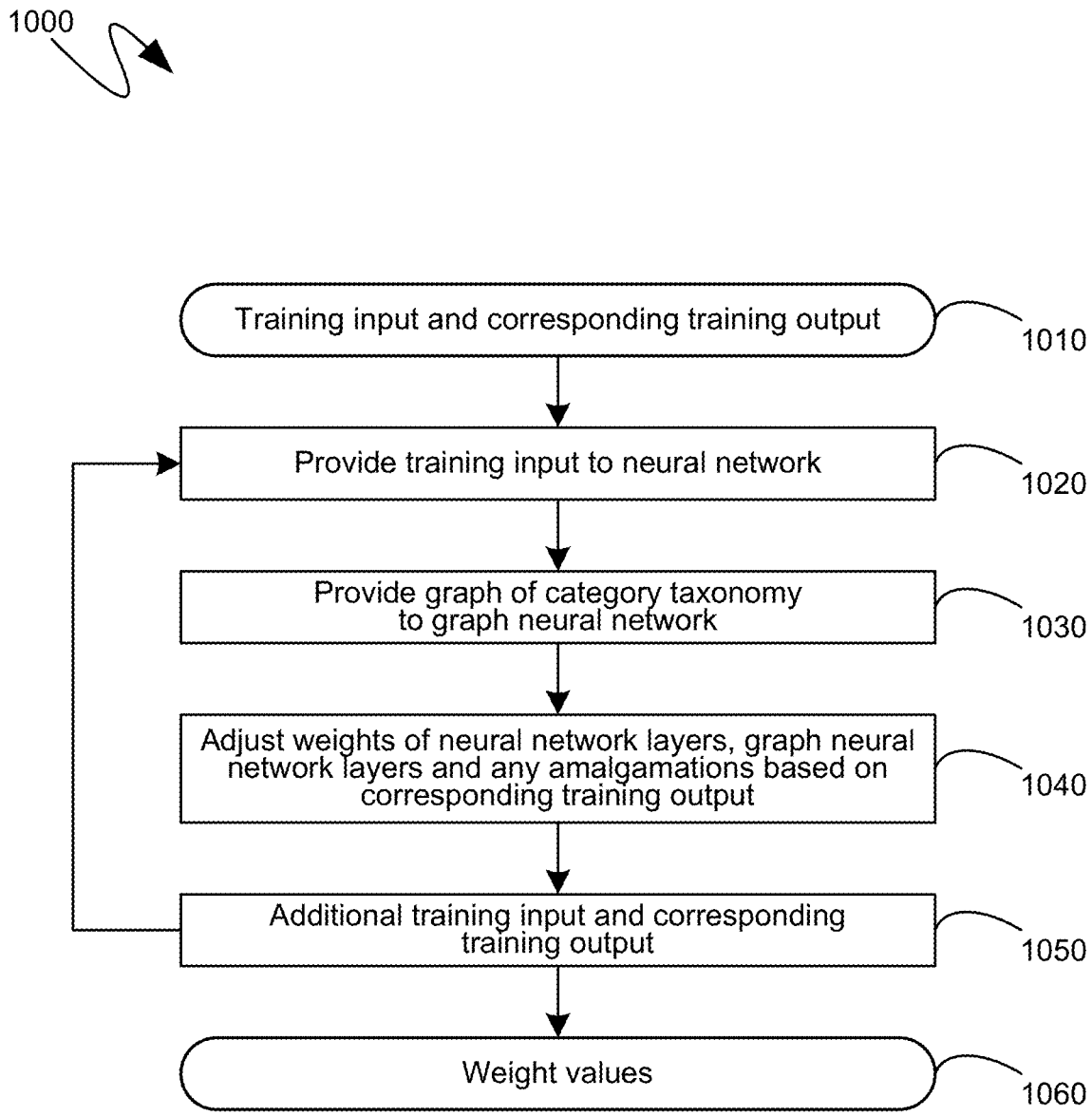
FIG. 10 is a flow diagram of an exemplary neural network categorization system training.

Turning to FIG. 10, the exemplary flow diagram 1000 shown therein illustrates an exemplary series of steps by which the above described systems can be trained. More specifically, and as illustrated, a training can commence with a set of training input and corresponding training output at step 1010. For example, if the input to be categorized are user search queries, then the training input can be previously categorized user search queries, and the corresponding training output can be a correct categorization of each of those user search queries. At step 1020, the training input can be provided to the neural network, such as the exemplary neural networks 640, 740 and/or 840, shown in FIGS. 6, 7, 8 and 9a-9c, and described in detail above. As indicated, the provision of training input, at step 1020, can include the semantic-based conversion of the training input from words and/or phrases to numerical values. According to one aspect, such a semantic-based conversion can convert words and/or phrases into multidimensional vectors corresponding to the semantical meaning of such words and/or phrases. Known semantic-based conversion mechanisms, such as FastText, can be utilized to perform such conversion. At step 1030, a graph of the category taxonomy, comprising nodes corresponding to individual categories and links representing explicit relationships between such categories, can be provided to a graph neural network, such as the exemplary graph neural network 620 shown in FIGS. 6, 7, 8 and 9a-9c, and described in detail above. As also indicated previously, the provision of the graph, at step 1030, can include the semantic-based conversion of the words and/or phrases utilized to label and/or describe the categories into numerical values, or, alternatively, the numerical values applied to the categories can be assigned values, such as integer values, that need not be have any semantic correlation to the categories. Additionally, is also indicated previously, the provision of the graph, at step 1030, can include numerical values indicative of the interrelationships between the nodes defined by the links of the graph. At step 1040, the weights of the various neural network layers, including, for example, neural network layers associated with the exemplary neural networks 640, 740 and/or 840, and the exemplary graph neural network 620, shown in FIGS. 6, 7, 8 and 9a-9c, can be adjusted so that, for the training input, the output of the neural network system matches as accurately as possible the corresponding training output. Such a process can be repeated, or performed in parallel, for additional training input and corresponding training output, as illustrated by step 1050. The establishment of weight values, at step 1060, can end the training process, and the established weight values can then be utilized to perform neural network-based categorization of input.

Figure 11:
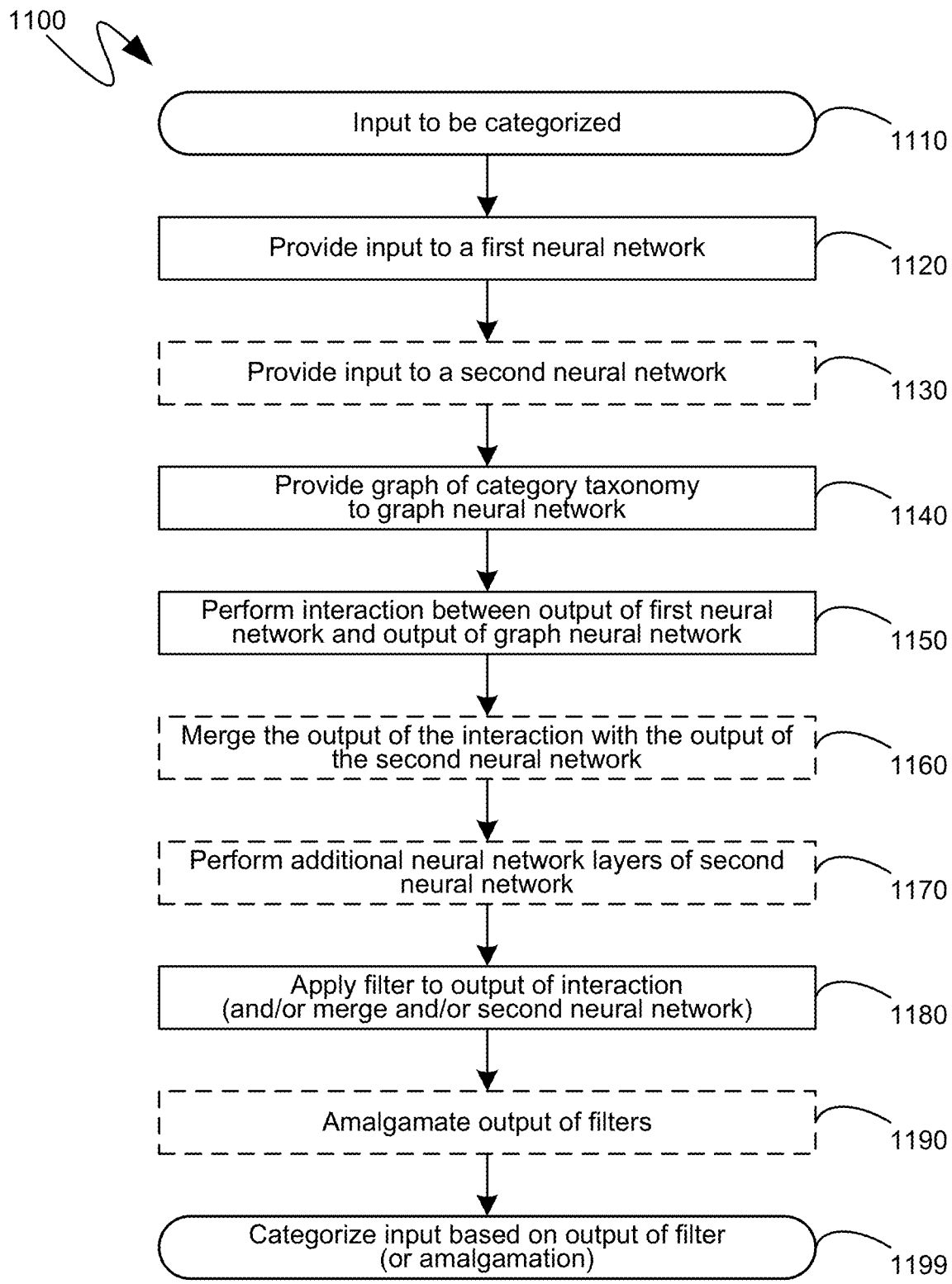
FIG. 11 is a flow diagram of an exemplary neural network-based categorization.

FIG. 11, the exemplary flow diagram 1100 shown therein illustrates an exemplary series of steps by which neural network-based categorization of input can be performed. Initially, at step 1110, an input to be categorized can be received. At step 1120, such an input can be provided to a first neural network, such as the exemplary neural network, 640, shown in FIGS. 6, 7, 8 and 9a-9c, and described in detail above. As with the training process, the provision of input, at step 1120, can include the semantic-based conversion of the input from words and/or phrases to numerical values, such as a multidimensional vector. Optionally, at step 1130, the input can also be provided to a second neural network, such as the exemplary neural network 740 and/or 840, shown in FIGS. 6, 7, 8 and 9a-9c, and described in detail above. Step 1130 is illustrated in FIG. 11 utilizing dashed lines to signify that it is optional and is dependent upon which of the aforedescribed systems is utilized to perform the neural network-based categorization of input. At step 1140, a graph of the category taxonomy, comprising nodes corresponding to individual categories and links representing explicit relationships between such categories, can be provided to a graph neural network, such as the exemplary graph neural network 620 shown in FIGS. 6, 7, 8 and 9a-9c, and described in detail above. If multiple inputs are to be categorized in accordance with a same category taxonomy, then the provision, at step 1140, of the graph of the category taxonomy to the graph neural network, need not be performed for each of the multiple inputs to be categorized. Instead, step 1140 can be performed once, with the output of the graph neural network being equally utilizable for multiple subsequent iterations, for multiple subsequent inputs, of the neural network-based categorization detailed herein.

Once the neural networks and graph neural networks have operated upon the input provided, the output of the graph neural network can interact with the output of the first neural network at step 1150. As indicated previously, such an interaction can comprise the performance of a dot product between multidimensional vectors, corresponding to nodes, which are output by the graph neural network and a multidimensional vector output by the first neural network. As also indicated previously, such an interaction can comprise the operation of a still further neural network that can achieve an interaction between multidimensional outputs having different dimensionalities. Depending upon the structure of the neural network-based categorization system, optional steps 1160 and 1170 can be performed after step 1150. For example, in a neural network-based categorization system analogous to that of systems 700, 800 and 901-903, illustrated in FIGS. 7, 8 and 9a-9c, and detailed above, the output of the interaction performed at step 1150 can, at step 1160, be further merged with the output of the second neural network. As indicated previously, such a merger can entail the addition of the two outputs, or other like amalgamation. Similarly, in a neural network-based categorization system analogous to that of systems 800, 902 and 903, illustrated in FIGS. 8 and 9b-9c, and also detailed above, the output of the merging, at step 1160, can be provided, at step 1170, to still further neural network layers of the second neural network. Although not illustrated, a still further merging can then be performed, such as is illustrated in the system 903 of FIG. 9c, and describe in detail above. At step 1180, filtering can be applied to the output of steps 1150, 1160 and/or 1170. As indicated previously such filtering can comprise a softmax function if the input is being categorized into a single category, and/or a sigmoid function if the input is being categorized into multiple categories. Optionally, at step 1190, if multiple paths through the neural network-based categorization system were performed, such as in the exemplary systems 901-903, illustrated in FIGS. 9a-9c, and detailed above, then a further amalgamation of the various output data can be performed. The amalgamation, at step 1190, can include applying weight values so as to weight the output of one path differently from the other. The exemplary flow diagram 1100 can then conclude, at step 1199, with the categorization of the input based on the numerical values, such as the largest, or most extreme numerical values, generated by steps 1180 and/or 1190.

Figure 12:
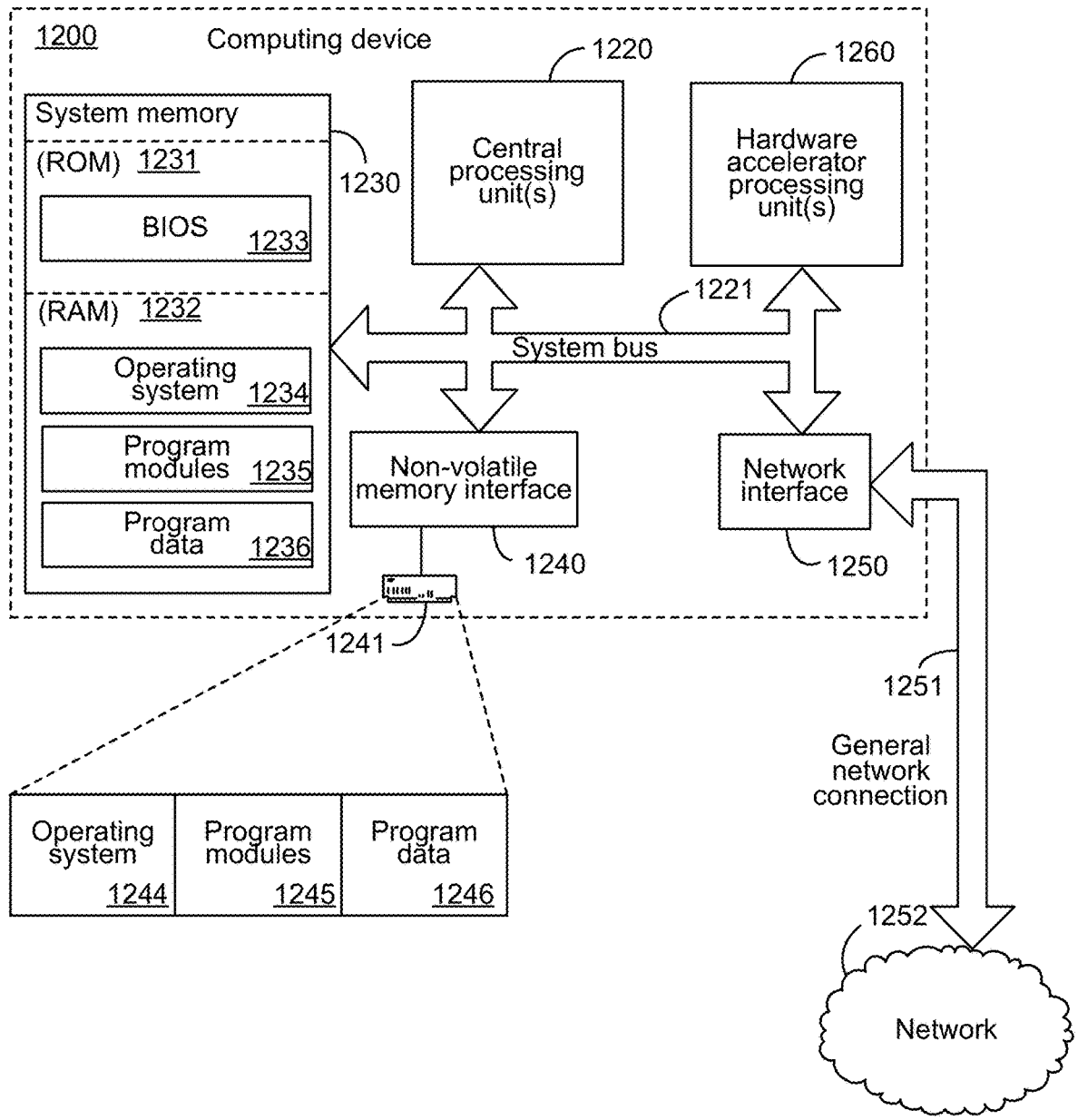
FIG. 12 is a block diagram of an exemplary computing device.

Turning to FIG. 12, an exemplary computing device 1200 is illustrated which can perform some or all of the mechanisms and actions described above. The exemplary computing device 1200 can include, but is not limited to, one or more central processing units (CPUs) 1220, one or more hardware accelerator processing units 1260, a system memory 1230, and a system bus 1221 that couples various system components including the system memory to the processing units 1220 and 1260. The central processing unit 1220 can comprise circuitry that provides for the performance of general processing operations. The hardware accelerator processing unit 1260 can comprise circuitry that provides for the performance of specific processing operations for which such circuitry is designed, and often comprises multiple such circuitry in parallel. The system bus 1221 may be any of several types of bus structures including a memory bus or memory controller, a peripheral bus, and a local bus using any of a variety of bus architectures. Depending on the specific physical implementation, one or more of the CPUs 1220, the system memory 1230, the hardware accelerator processing unit 1260 and other components of the computing device 1200 can be physically co-located, such as on a single chip. In such a case, some or all of the system bus 1221 can be nothing more than silicon pathways within a single chip structure and its illustration in FIG. 12 can be nothing more than notational convenience for the purpose of illustration.

The computing device 1200 also typically includes computer readable media, which can include any available media that can be accessed by computing device 1200 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 1200. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 1230 includes computer storage media in the form of volatile and/or nonvolatile memory such as read only memory (ROM) 1231 and random access memory (RAM) 1232. A basic input/output system 1233 (BIOS), containing the basic routines that help to transfer content between elements within computing device 1200, such as during start-up, is typically stored in ROM 1231. RAM 1232 typically contains data and/or program modules that are immediately accessible to and/or presently being operated on by processing unit 1220. By way of example, and not limitation, FIG. 12 illustrates operating system 1234, other program modules 1235, and program data 1236.

The computing device 1200 may also include other removable/non-removable, volatile/nonvolatile computer storage media. By way of example only, FIG. 12 illustrates a hard disk drive 1241 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 1241 is typically connected to the system bus 1221 through a non-volatile memory interface such as interface 1240.

The drives and their associated computer storage media discussed above and illustrated in FIG. 12, provide storage of computer readable instructions, data structures, program modules and other data for the computing device 1200. In FIG. 12, for example, hard disk drive 1241 is illustrated as storing operating system 1244, other program modules 1245, and program data 1246. Note that these components can either be the same as or different from operating system 1234, other program modules 1235 and program data 1236. Operating system 1244, other program modules 1245 and program data 1246 are given different numbers hereto illustrate that, at a minimum, they are different copies.

The computing device 1200 may operate in a networked environment using logical connections to one or more remote computers. The computing device 1200 is illustrated as being connected to the general network connection 1251 (to the network 190) through a network interface or adapter 1250, which is, in turn, connected to the system bus 1221. In a networked environment, program modules depicted relative to the computing device 1200, or portions or peripherals thereof, may be stored in the memory of one or more other computing devices that are communicatively coupled to the computing device 1200 through the general network connection 12121. It will be appreciated that the network connections shown are exemplary and other means of establishing a communications link between computing devices may be used.

Although described as a single physical device, the exemplary computing device 1200 can be a virtual computing device, in which case the functionality of the above-described physical components, such as the CPU 1220, the system memory 1230, the network interface 1240, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 1200 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example a method of improving neural network categorization accuracy, the method comprising: providing a graph to a graph neural network, the graph comprising: (1) nodes corresponding to categories and (2) edges between the nodes in accordance with explicit relationships between the categories in a pre-established taxonomy; providing, to a first neural network, a first input that is to be categorized into one or more of the categories; performing an interaction between an output of the graph neural network and an output of the first neural network to generate scores associated with the categories; and categorizing the first input into a first category based on a first generated score, associated with a first category, being either greater than others of the generated scores or greater than a threshold.

A second example is the method of the first example, wherein the providing the graph to the graph neural network comprises converting a first node into a first multi-dimensional vector in accordance with a semantic meaning of a first word or phrase, the first word or phrase utilized to label or describe a first category to which the first node corresponds.

A third example is the method of the first example, wherein the providing the first input to the first neural network comprises converting the first input into a second multi-dimensional vector in accordance with a semantic meaning of a second word or phrase, the first input being the second word or phrase.

A fourth example is the method of the first example, wherein the output of the graph neural network comprises multi-dimensional outputs corresponding to individual ones of the nodes, each individually having a same dimensionality as the output of the neural network.

A fifth example is the method of the first example, wherein the performing the interaction between the output of the graph neural network and the output of the first neural network comprises performing a dot product of a first vector and a second vector, the output of the graph neural network comprising the first vector and the output of the first neural network comprising the second vector.

A sixth example is the method of the first example, wherein the categorizing comprises filtering an output of the interaction to identify the first generated score as being either greater than the others of the generated scores or greater than a threshold, the filtering comprising applying at least one of a softmax or sigmoid function to the output of the interaction.

A seventh example is the method of the first example, further comprising: providing the first input to a second neural network; and performing a merging of a first output of the second neural network and an output of the interaction between the output of the graph neural network and the output of the first neural network.

An eighth example is the method of the seventh example, wherein the scores associated with the categories are generated by the merging.

A ninth example is the method of the seventh example, wherein the first output of the second neural network is from an initial one or more neural network layers of the second neural network, the method further comprising: providing an output of the merging to a subsequent one or more neural network layers of the second neural network; wherein the scores associated with the categories are generated from a second output of the second neural network, the second output being from the subsequent one or more neural network layers of the second neural network.

A tenth example is the method of the seventh example, wherein the merging is a vector addition of a first vector, being the output of the interaction between the output of the graph neural network and the output of the first neural network, and a second vector, being the first output of the second neural network.

An eleventh example is the method of the seventh example, wherein weight values utilized by neural network layers of the first neural network differ from weight values utilized by neural network layers of the second neural network.

A twelfth example is the method of the seventh example, further comprising: amalgamating: (1) a first output, which is either directly or indirectly generated by the merging, and (2) the output of the interaction between the output of the graph neural network and the output of the first neural network.

A thirteenth example is the method of the twelfth example, wherein the amalgamating comprises: assigning a first weight to the first output; assigning a second weight to the output of the interaction; wherein the second weight differs from the first weight.

A fourteenth example is the method of the thirteenth example, wherein the second weight is greater than 10% of the first weight.

A fifteenth example is the method of the twelfth example, wherein the first output is indirectly generated by the merging, the first output being directly generated by a subsequent one or more neural network layers of the second neural network, the subsequent one or more neural network layers of the second neural network having been provided, as input, an output that was directly generated by the merging.

A sixteenth example is the method of the twelfth example, wherein the amalgamating further comprises amalgamating: (1) the first output, the first output being directly generated by the merging, (2) the output of the interaction between the output of the graph neural network and the output of the first neural network and (3) a second output, the second output being generated by a subsequent one or more neural network layers of the second neural network, the subsequent one or more neural network layers of the second neural network having been provided, as input, the first output.

A seventeenth example is a system for performing categorization of a first input into one or more categories arranged in a pre-established taxonomy, the system comprising: a first set of computing devices, in aggregate, implementing a graph neural network comprising one or more graph neural network layers, each graph neural network layer utilizing a corresponding set of weight values; a second set of computing devices, in aggregate, implementing a first neural network comprising one or more neural network layers, each neural network layer utilizing a corresponding set of weight values, the weight values corresponding to the neural network layers of the first neural network differing from the weight values corresponding to the graph neural network layers of the graph neural network; and a third set of computing devices categorizing the first input into a first category by performing an interaction between an output of the first set of computing devices and an output of the second set of computing devices to generate scores associated with the categories, the categorization of the first input into the first category being based on a first generated score, associated with the first category, being either greater than others of the generated scores or greater than a threshold; wherein the first set of computing devices is provided, as input to the graph neural network, a graph comprising: (1) nodes corresponding to the categories and (2) edges between the nodes in accordance with explicit relationships between the categories in the pre-established taxonomy; and wherein the second set of computing devices is provided, as input to the first neural network, the first input.

An eighteenth example is the system of the seventeenth example, further comprising: a fourth set of computing devices, in aggregate, implementing a second neural network comprising one or more neural network layers, each neural network layer utilizing a corresponding set of weight values, the weight values corresponding to the neural network layers of the second neural network differing from the weight values corresponding to the neural network layers of the first neural network and also differing from the weight values corresponding to the graph neural network layers of the graph neural network; wherein the third set of computing devices generates the scores associated with the categories by merging an output of the fourth set of computing devices and an output of the interaction between the output of the first set of computing devices and the output of the second set of computing devices.

A nineteenth example is the system of the eighteenth example, wherein the third set of computing devices generates the scores associated with the categories by amalgamating an output of the merging and an output of the interaction.

A twentieth example is one or more computer-readable storage media comprising computer-executable instructions, which, when executed, cause one or more computing devices to: receive, as input to a graph neural network, a graph comprising: (1) nodes corresponding to categories and (2) edges between the nodes in accordance with explicit relationships between categories in a pre-established taxonomy; receive, as input to a first neural network, a first input that is to be categorized into one or more of the categories; perform an interaction between an output of the graph neural network and an output of the first neural network to generate scores associated with the categories; and categorize the first input into a first category based on a first generated score, associated with a first category, being either greater than others of the generated scores or greater than a threshold.

As can be seen from the above descriptions, mechanisms for improving neural network-based categorization by incorporate a graph neural network have been presented. In view of the many possible variations of the subject matter described herein, we claim as our invention all such embodiments as may come within the scope of the following claims and equivalents thereto.

We claim:

1. A method comprising:
providing a graph to a graph neural network, the graph comprising nodes corresponding to categories and edges between the nodes in accordance with relationships between the categories;
providing, to a machine learning model, a first input that is to be categorized into one or more of the categories;
performing an interaction between an output of the graph neural network and an output of the machine learning model, the interaction generating scores associated with the categories; and
categorizing the first input into a first category based at least on the scores.

2. The method of claim 1, the machine learning model comprising another neural network.

3. The method of claim 1, further comprising:
prior to categorizing the first input, training the graph neural network and the machine learning model by:
providing training inputs to the machine learning model, the training inputs having corresponding training outputs;
performing training interactions between the graph neural network and the machine learning model to generate interaction outputs; and
based at least on the training outputs and the interaction outputs, adjusting parameters of the graph neural network and the machine learning model.

4. The method of claim 3, the graph neural network comprising a graph convolutional neural network or a graph attentional neural network, the machine learning model comprising another neural network.

5. The method of claim 1, wherein the output of the graph neural network comprises respective vectors representing the categories arranged relative to one another according to the graph.

6. The method of claim 5, wherein the output of the machine learning model comprises another vector representing the first input.

7. The method of claim 6, wherein the scores are based at least on vector similarity of the another vector representing the first input to the respective vectors representing the categories.

8. The method of claim 7, wherein the interaction comprises computing dot products between the another vector representing the first input and the respective vectors representing the categories.

9. A system comprising:
a processing unit; and
a computer-readable storage medium storing computer-executable instructions, which, when executed, cause the system to:
provide a graph to a graph neural network, the graph comprising nodes corresponding to categories and edges between the nodes in accordance with relationships between the categories;
provide, to a machine learning model, a first input that is to be categorized into one or more of the categories;
perform an interaction involving the graph neural network and the machine learning model; and
based at least on the interaction, determine a first category of the first input.

10. The system of claim 9, wherein the computer-executable instructions, when executed, cause the system to:
perform the interaction between an output of the graph neural network and an output of the machine learning model to obtain an interaction output; and
perform a merge of the interaction output with another output of another machine learning model,
the first category being determined based at least on the merge.

11. The system of claim 10, wherein the computer-executable instructions, when executed, cause the system to:
provide the first input to the another machine learning model.

12. The system of claim 10, wherein the computer-executable instructions, when executed, cause the system to:

tune the graph neural network, the machine learning model, and the another machine learning model together.

13. The system of claim 9, wherein the interaction results in respective category scores for the first input and the first category is determined based at least on the category scores.

14. The system of claim 13, wherein the computer-executable instructions, when executed, cause the system to:
determine that the first input corresponds to the first category based at least on a first category score for the first category exceeding other category scores for other categories.

15. The system of claim 13, wherein the computer-executable instructions, when executed, cause the system to:
determine that the first input corresponds to the first category based at least on a first category score for the first category exceeding a threshold.

16. A computer-readable storage medium storing computer-executable instructions, which, when executed, cause a computing device to perform acts comprising:
providing a graph to a graph neural network, the graph comprising nodes corresponding to categories and edges between the nodes in accordance with relationships between the categories;
providing, to a machine learning model, a first input that is to be categorized into one or more of the categories; and
determining a first category of the first input based at least on an output of the graph neural network and an output of the machine learning model.

17. The computer-readable storage medium of claim 16, the acts further comprising:
training the graph neural network together with the machine learning model using training inputs having labels identifying categories of the training inputs.

18. The computer-readable storage medium of claim 16, the machine learning model comprising another neural network.

19. The computer-readable storage medium of claim 18, the graph neural network comprising a graph convolutional neural network.

20. The computer-readable storage medium of claim 18, the graph neural network comprising a graph attentional neural network.

* * * * *